(12) United States Patent
Hegde et al.

(10) Patent No.: US 10,757,866 B2
(45) Date of Patent: Sep. 1, 2020

(54) MULTI CHANNEL ELECTRONIC DRIVER FOR PLANT GROWTH

(71) Applicant: Ledvance LLC, Wilmington, MA (US)

(72) Inventors: Ravidasa Hegde, Andover, MA (US); Arunava Dutta, Winchester, MA (US); Nilesh Patel, East Windsor, NJ (US)

(73) Assignee: LEDVANCE LLC, Wilmington, MA (US)

( * ) Notice: Subject to any disclaimer, the term of this patent is extended or adjusted under 35 U.S.C. 154(b) by 375 days.

(21) Appl. No.: 15/941,157

(22) Filed: Mar. 30, 2018

(65) Prior Publication Data

US 2019/0297784 A1    Oct. 3, 2019

(51) Int. Cl.

| | |
|---|---|
| *H05B 37/00* | (2006.01) |
| *H05B 39/00* | (2006.01) |
| *H05B 41/00* | (2006.01) |
| *A01G 7/04* | (2006.01) |
| *A01G 9/24* | (2006.01) |
| *H05B 45/00* | (2020.01) |
| *H05B 45/10* | (2020.01) |
| *H05B 45/37* | (2020.01) |
| *F21Y 115/10* | (2016.01) |

(52) U.S. Cl.
CPC ............ *A01G 7/045* (2013.01); *A01G 9/24* (2013.01); *H05B 45/00* (2020.01); *H05B 45/10* (2020.01); *H05B 45/37* (2020.01); *F21Y 2115/10* (2016.08); *H05B 45/60* (2020.01)

(58) Field of Classification Search
None
See application file for complete search history.

(56) References Cited

U.S. PATENT DOCUMENTS

| | | | |
|---|---|---|---|
| 9,301,359 B2 * | 3/2016 | Wray | H05B 45/3577 |
| 2007/0052376 A1 * | 3/2007 | Lee | H05B 45/20 |
| | | | 315/312 |
| 2010/0328946 A1 * | 12/2010 | Borkar | F21K 9/233 |
| | | | 362/249.02 |
| 2013/0009560 A1 * | 1/2013 | Takeda | H05B 45/37 |
| | | | 315/201 |
| 2018/0227991 A1 * | 8/2018 | Hegde | H05B 45/20 |

* cited by examiner

*Primary Examiner* — Anh Q Tran
(74) *Attorney, Agent, or Firm* — Tutunjian & Bitetto PC

(57) ABSTRACT

A lamp including a body for containing a light engine that includes at least a first and second string of said light emitters. The lamp includes driver electronics including an AC-DC switching power supply section of a circuit including a first potentiometer for adjusting total current to the light engine; and a linear topology LED string current control section of the circuit including an operational amplifier controlled by a second potentiometer to operate a field effect transistor (FET) in the linear portion of the FETs operation range to adjust a percentage of the total current to the first and second string of the light emitters. Adjusting the total current adjusts the photosynthetic photon flux (PPF) of light emitted by the lamp. Adjusting the percentage of the total current to the first and second string of the light emitters adjusts the spectral power distribution of light being emitted by the lamp.

20 Claims, 10 Drawing Sheets

US 10,757,866 B2

MULTI CHANNEL ELECTRONIC DRIVER FOR PLANT GROWTH

TECHNICAL FIELD

The present disclosure generally relates to lighting, and more particularly to lamps that project light wavelengths that promote plant growth.

BACKGROUND

The growth and development of plants mainly relies on sunlight. In some instances, e.g., commercial crops, such as vegetables, flowers and medicinal plants, their industrialization and tissue culture relies upon artificial light. This can especially be the case when the light application time is very short, or in seasons that include weather having continuous cloudy days, rain filled days and/or snow days. Artificial lighting, as a direct light supply inside greenhouses, is an efficient way to promote the growth of plants. The theoretical basis on efficient and energy-saving supplementary light for plants is mainly from the theory that plants will absorb the light selectively. LED light sources can be used as artificial lighting inside greenhouses so as to enhance growth and quality of plants. Compared with traditional artificial lighting, features of LEDs include adjustable light intensity, light spectrum, low cooling load, high electro-optic conversion efficiency, small volume, long service life, using direct current and setting of special wavelength, fixing of wavelength etc, without harmful gas or with good performance on environmental protection, and thus LED is an artificial lighting system quite suitable for tissue culture of plants.

SUMMARY

In one aspect, a LED lamp is provided for horticultural lighting including mechanisms for user adjustments to photosynthetic photon flux (PPF) and spectral power distribution (SPD) without the use of a microcontroller. The lamp design employs driver electronics including an AC-DC power supply front section including a first potentiometer for controlling total current to the light engine of the lamp; and a linear topology LED string current control portion including an operational amplifier and a second potentiometer, wherein the second potentiometer is for controlling the percentage of current to each string of LED emitters in the light engine. Adjustments to the total current provide for adjustments to the photosynthetic photon flux (PPF) of light emitted by the light engine of the lamp. Adjustments to the percentage of current to each string of LED emitters in the light engine provide for adjustments to the spectral power distribution of light being emitted by the lamp.

In one embodiment, the lamp includes a body for containing a light engine that includes at least a first and second string of said LED light emitters. The lamp includes driver electronics including an AC-DC switching power supply section of a circuit including a first potentiometer for adjusting total current to the light engine; and a linear topology LED string current control section of the circuit including an operational amplifier controlled by a second potentiometer to operate a field effect transistor (FET) in the linear portion of the FETs operation range to adjust a percentage of the total current to the first and second string of the light emitters. Adjusting the total current adjusts the photosynthetic photon flux (PPF) of light emitted by the lamp. Adjusting the percentage of the total current to the first and second string of the light emitters adjusts the spectral power distribution of light being emitted by the lamp.

In another aspect, a method of horticultural growth method is provided that includes providing at least a first and second string of light emitting diodes having driver electronics including an AC-DC switching power supply section of a circuit including a first potentiometer for adjusting total current to the light engine, and a linear topology LED string current control section of the circuit including an operational amplifier controlled by a second potentiometer to operate a field effect transistor (FET) in the linear portion of the FETs operation range to adjust a percentage of the total current to the first and second string of the light emitters. The method further includes adjusting the first potentiometer for adjusting the total current to the light engine to adjust the photosynthetic photon flux (PPF) of light emitted by the light engine of the lamp. The method further includes adjusting the second potentiometer to adjust the percentage of the total current to the first and second string of the light emitters to adjust the spectral power distribution (SPD) of the light emitted by the light engine of the lamp. The adjustments to the photosynthetic photon flux (PPF) and the spectral power distribution (SPD) do not employ a microcontroller.

BRIEF DESCRIPTION OF THE DRAWINGS

The following description will provide details of embodiments with reference to the following figures wherein.

DETAILED DESCRIPTION

Figure 1:
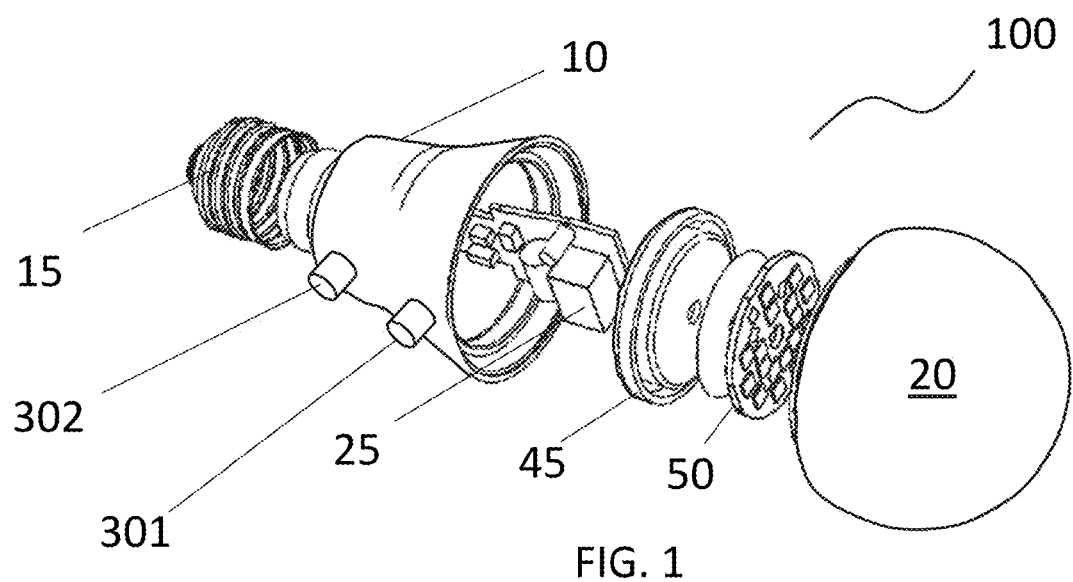
FIG. 1 is an exploded perspective view of a lamp for horticultural lighting that includes a light engine having a plurality of light emitting diodes (LEDs) strings, a switch mode front end power supply section and a driver including a linear topology LED string current control circuit, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The structures, methods and lighting systems described herein provide for an energy efficient light emitting diode (LED) based horticultural lamp that can provide adequate control over the growth cycle of plants at an affordable cost. In some embodiments, affordability is achieved by employing a low cost multi-channel electronic driver for the lamp. A light emitting diode is a form of solid state light emitter. The term "solid state" refers to light emitted by solid-state electroluminescence, as opposed to incandescent bulbs (which use thermal radiation) or fluorescent tubes, which use a low pressure Hg discharge. In a broad sense, a light emitting diode (LED) is a semiconductor device that emits visible light when an electric current passes through it. In some embodiments, the structures and lighting systems described herein, present a low cost electronic driver for plant growth that is designed using a switch mode front end power supply section (AC-DC switching power supply section) and a linear topology LED string current control circuit to provide a 0% to 100% control over the current in the LED strings.

Numerous incandescent, high-intensity discharge (HID), and fluorescent lighting sources for plant growth exist. However, each of these existing artificial lighting options is not without significant drawbacks. For instance, incandescent sources are very energy inefficient (i.e., a very small portion of the input electrical energy is converted into visible photons) and generate a lot of undesirable heat, requiring them to be sufficiently distanced from the plants to avoid plant damage, which further lowers their effectiveness. HID lamp sources also generate heat and are deficient in the blue portion (400-500 nm) of the spectrum that typically stimulates Chlorophyll B pigments in the plant, which is particularly important for photosynthesis in young plants, and helps with $CO_2$ gas exchange. Although fluorescent sources generate less undesirable heat than incandescent and HID sources, they contain the hazardous material mercury, and thus use of fluorescent sources near plants and disposal of such sources are an issue.

Light emitting diodes (LEDs) provide one solution to the above described deficiencies in growth lights incorporating incandescent, high-intensity discharge (HID), and fluorescent lighting sources. However, although horticultural lamps employing light emitting diode (LED) light sources with electronic drivers that have microcontroller based switching schemes provide very good control over the spectrum along the growth cycle of the plant; their cost can limit their application. The typical microcontroller employs a pulse width modulation (PWM) system for controlling the lighting of an LED. The driver topologies associated with the use of this type of microcontroller warrant that the LED string voltages be fairly close to each other. It has been determined that this can lead to a situation in which additional LEDs over and above what is dictated for spectral emission requirements are needed in one or more of the LED strings causing a higher LED cost.

Figure 8:
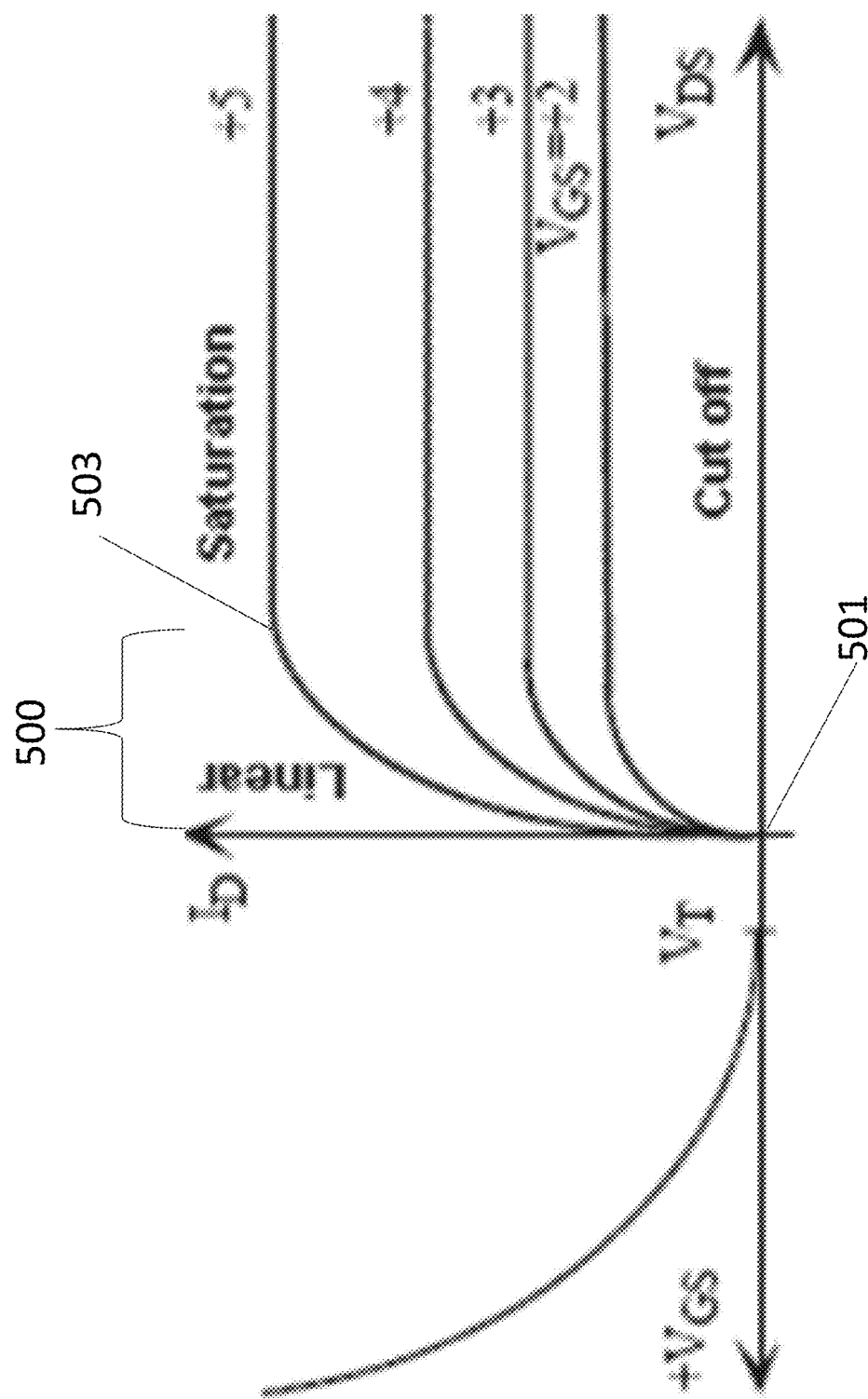
FIG. 8 is a plot of the linear region of operation for a field effect transistor as used in the linear topology LED string current control section of the driver electronics, in accordance with one embodiment.

In some embodiments, the structures, methods and lighting systems described herein, present a low cost electronic driver for plant growth that is designed using a switch mode front end power supply section and a linear topology LED string current control circuit to provide a 0 to 100% control over the current in the LED strings. As will be described in further detail below, the linear topology is provided by the linear topology string control section 300 of the driver electronics 25 for the lamp 100. The topology is being referred to as "linear", because the switch that is controlling the percentage of total current from the linear current control section 300 of the driver electronics 25 to each of the strings of LEDs, e.g., first and second string of LEDs 55a, 55b, 108b, of the light engine 50 is a field effect transistor (FET) Q2 that is operated in the linear portion of the current-voltage (I-V) curve of the operation range for the field effect transistor. This is described in greater detail below, and an example current-voltage (I-V) curve for a field effect transistor having a linear operation region is depicted in FIG. 8.

Distinguished from the linear topology LED string current control is the pulse width modulation (PWM) system for controlling the lighting of an LED. By comparison, in the case of pulse width modulation (PMW), the duty cycle of the LED current (at maximum level) is varied to change the average current in the LED device.

The linear topology for an LED string current control is more cost effective than the pulse width modulation (PWM) topology for a microcontroller based LED string current control. Further, in some embodiments, the linear topology string current control is advantageous to a pulse width modulation (PWM) topology in that it allows the two (or more) LED strings to have LED voltages that are not necessarily the same, or close to being the same. In other words, imbalanced LED string voltages can be used with the linear topology described in this disclosure. A resistor may be used in series with the LED string in case the voltages of both strings are same or similar, so that one string voltage is higher than the other.

The structures and lighting systems described herein can provide a low cost multi-channel electronic driver that is able to drive multiple LED strings in, for example, a horticultural lamp.

In nature, sunlight is the primary source of light energy for plant growth. The photons in the visible spectrum of sunlight that range in wavelength from about 400-700 nm stimulate pigments (e.g., Chlorophyll A and Chlorophyll B) in plants. This is necessary for optimum photosynthesis in plants, which leads to the production of vital sugars in the presence of carbon dioxide ($CO_2$) and water ($H_2O$). Without photosynthesis, there cannot be plant growth, and thus light is essential for the growth of plants. For light emitting diodes (LEDs) to adequately function for plant growth lights, the LEDs should produce light having wavelengths that can stimulate pigments, such as Chlorophyll A and Chlorophyll B, in plants. The spectral power distribution (SPD) of a horticultural lamp plays a major part in the effectiveness of the photosynthesis process, which is key to plant growth. The shape of the lamp spectrum over the different wavelengths, the relative intensity of the SPD at different wavelengths, and the relative spectral power in the blue, green, and red regions of the spectrum can all be important parameters that influence the development of plants over their growth cycle. The SPD of the horticultural lamp is created by the emission of the LEDs which in turn are driven by electronics in the form a power supply located in the lamp.

In some embodiments, the structures, methods and lighting systems described herein can provide a horticultural lamp that employs a low cost multi-channel electronic driver that employs a linear topology able to drive multiple LED strings. For example, the driver can be set for the LEDs to emit any desired spectrum of light, e.g., all the way from a complete blue to a complete red to any spectrum in between, which gives the user complete freedom to choose any ratio of blue to the red in the spectrum. In some instances to provide this flexibility in light emission from the horticultural lamp, the LED light engine may include more than one string of LEDs. For example, the LED light engine may include two strings of LEDs, which in some embodiments can enable the lamp to produce an all blue output necessary for example for young plants and saplings. The use of multiple LED strings in a single LED light engine can also enable the lamp to reduce the emission of one spectra of light, while increasing the spectra of another wavelength of light depending upon the growth stage of a plant and/or depending upon the type of plant. For example, the driver employing the linear topology as used in some embodiments of the horticultural lamp of present disclosure, can emit any desired spectrum of blue emission, while simultaneously increasing the red emission as the plant progresses in its life cycle from the stem/leaf stage to the flowering/fruiting stage. This is only one example, of how the driver system employing linear topology may select light emission. For example, in other embodiments, this driver will also enable the horticultural lamp to change to all red emission when the plant has grown adequately to focus on flowering and fruiting.

The lamp structures provided herein include driver electronics having an AC-DC switching power front end section 200 that includes a potentiometer R14 for adjusting the total current that is being sent to the LEDs, which in turn adjusts the photosynthetic photon flux (PPF) of the light being emitted from the lamp.

Various embodiments of the disclosed lamp are now presented with further detail with reference to FIGS. 1-12.

Figure 2:
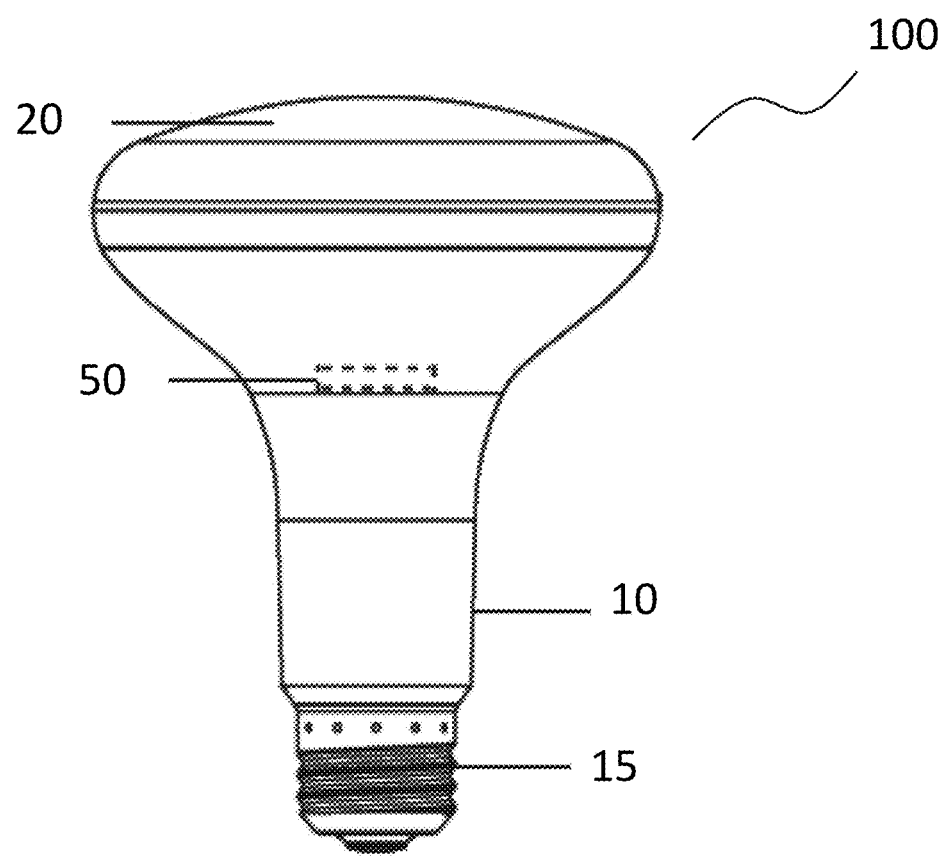
FIG. 2 is a side cross-sectional view of the lamp depicted in FIG. 1.

FIGS. 1 and 2 illustrate an example solid-state lamp 100 configured in accordance with an embodiment of the present disclosure. As can be seen, lamp 100 may include a body portion 10, the material, geometry, and dimensions of which may be customized, as desired for a given target application or end-use.

In some embodiments, the body 10 has a first end, e.g., base portion 15, for engagement to an electrical source for energizing the light sources 50, i.e., first and second strings of LEDs 55a, 55b, contained within the body 10, and the body 10 includes a second end having an optic 20, e.g., lens, through which the light sources 50 emit light.

Figure 3:
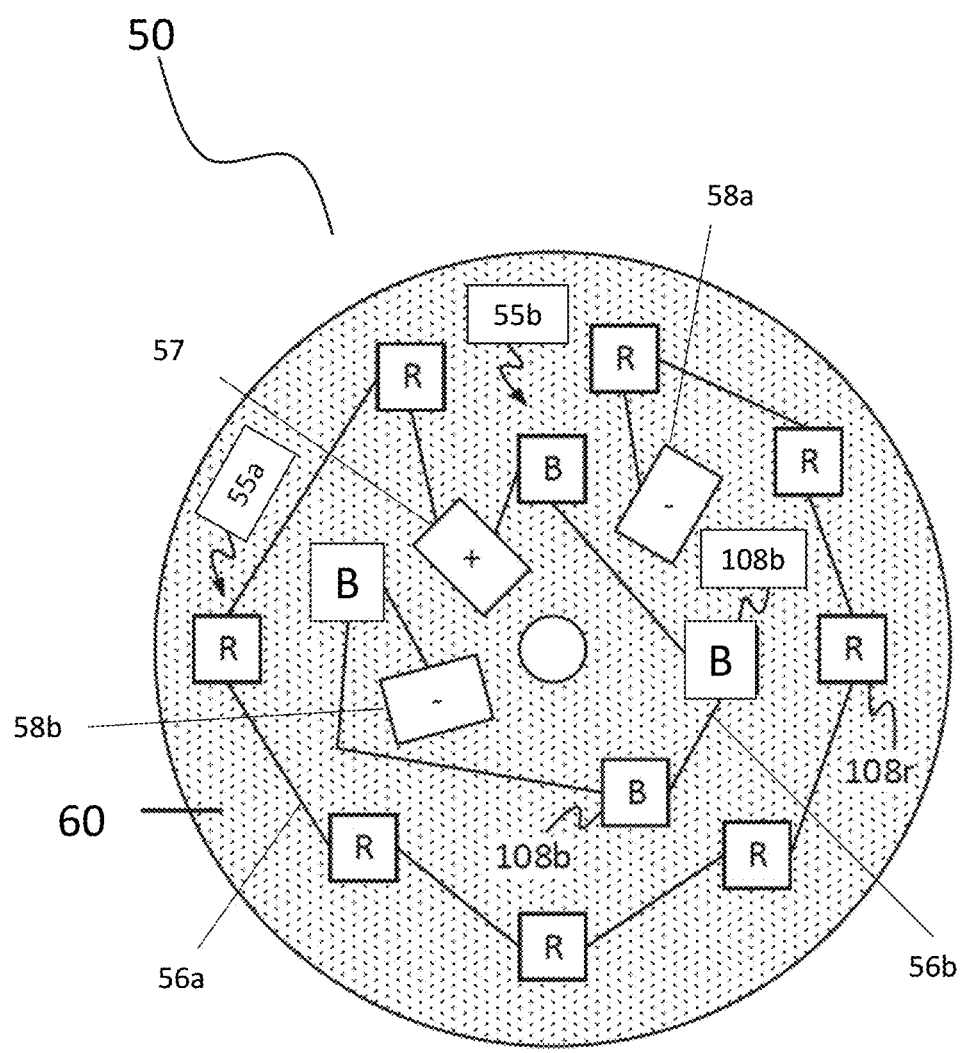
FIG. 3 is a top down view of one embodiment of a light engine configuration including a plurality of solid state light emitters for the light source of a lamp as depicted in FIGS. 1 and 2.

The light source 50 is depicted in more detail in FIG. 3, which illustrates the first and second strings of LEDs 55a, 55b. The string of LEDs identified by reference number 55a may interchangeably be referred to as LED string 1, and is a string of red light emitting LEDs. The string of LEDs identified by reference number 55b may interchangeably be referred to as LED string 2, and is a string of blue light emitting LEDs.

Referring to FIGS. 1 and 2, a given optic 20 may be configured to transmit, in part or in whole, emissions received from a given string of the first and second strings of LEDs 55a, 55b of the light source 50 that is positioned behind the given optic 20 and housed within the base portion 10 of the lamp 100. The optic 20 may be formed from any one, or combination, of suitable optical materials. For instance, in some embodiments, the optic 20 may be formed from a polymer, such as poly (methyl methacrylate) (PMMA) or polycarbonate, among others. In some embodiments, the optic 20 may be formed from a ceramic, such as sapphire ($Al_2O_3$) or yttrium aluminum garnet (YAG), among others. In some embodiments, the optic 20 may be formed from a glass. In some embodiments, the optic 20 can be formed from a combination of any of the aforementioned materials. Furthermore, the dimensions and geometry of the optic 20 may be customized, as desired for a given target application or end-use. In some embodiments, the optic 20 may be or otherwise include a lens, such as a Fresnel lens, a converging lens, a compound lens, or a micro-lens array, to name a few. In some embodiments, the optic 20 may be or otherwise include an optical dome or optical window. In some cases, the optic 20 may be formed as a singular piece of optical material, providing a monolithic optical structure. In some other cases, the optic 20 may be formed from multiple pieces of optical material, providing a polylithic (multi-piece) optical structure. In some instances, the optic 20 may be configured to filter light transmitted there through. Other suitable configurations for optic(s) 20 will depend on a given application and will be apparent in light of this disclosure.

The base portion 15 may be configured to be operatively coupled with a given power socket so that power may be delivered to lamp 100 for operation thereof. To that end, base portion 15 may be of any standard, custom, or proprietary contact type and fitting size, as desired for a given target application or end-use. In some cases, base portion 15 may be configured as a threaded lamp base including an electrical foot contact (e.g., an Edison-type screw base, such as in FIGS. 1 and 2). In some other cases, base portion 15 may be configured as a bi-pin, tri-pin, or other multi-pin lamp base. In some other cases, base portion 15 may be configured as a twist-lock mount lamp base. In some other cases, base portion 15 may be configured as a bayonet connector lamp base. Other suitable configurations for body portion 10 and base portion 15 will depend on a given application and will be apparent in light of this disclosure.

It is noted that the structure and lamp systems of the present disclosure are not limited to only the form factor for the lamp 100 that is depicted in FIG. 1. As will be appreciated in light of this disclosure, the lamp as variously described herein may also be configured to have a form factor that is compatible with power sockets/enclosures typically used in existing luminaire structures. For example, some embodiments may be of a PAR20, PAR30, PAR38, or other parabolic aluminized reflector (PAR) configuration. Some embodiments may be of a BR30, BR40, or other bulged reflector (BR) configuration. Some embodiments may be of an A19, A21, or other A-line configuration. Some embodiments may be of a T5, T8, or other tube configuration. In accordance with some embodiments, a lamp 100 configured as variously described herein may be considered, in a general sense, a retrofit or other drop-in replacement lighting component. As will be further appreciated in light of this disclosure, the particular configuration of a lamp 100 may be customized, for instance, to provide a given amount of photosynthetic photon flux (PPF) desired for a given horticultural or other target application or end-use.

Referring to FIGS. 1-3, present within the body 10, and between the base portion 15, and the optic 20, the lamp 100 also includes a first group of solid state light emitters, e.g., first string of LEDs 55a, providing one grouping of the light sources 50 contained within the body 10 of the housing, wherein illuminated the first group of solid state light emitters produces a first range of light wavelengths emitted by the first group of solid state light emitters, e.g., LEDs. Referring to FIGS. 1 and 2, a second group of solid state light emitters, e.g., second string of LEDs 55b, provides another grouping for the light sources 50 contained within the housing, wherein when illuminated the second group of the light sources 55b contained within the housing produces a second range of light wavelengths. It is noted that the two strings of LEDs 55a, 55b are provided for illustrative purposes only, and are not intended to limit the present disclosure. It is noted that any number of LED strings 55a, 55b (interchangeably referred to herein as "at least two LED strings 55a, 55b"), may be employed in methods, structures and lighting systems of the present disclosure. Some examples of solid state light emitters that are suitable for the methods and structures described herein include inorganic semiconductor light-emitting diodes (LEDs), organic light-emitting diodes (OLED), polymer light-emitting diodes (PLED) or combinations thereof. Although the following description describes an embodiment in which the solid state light emitters are provided by light emitting diodes, any of the aforementioned solid state light emitters may be substituted for the LEDs. The light sources 50, e.g., at least two LED strings 55a, 55b, may be described in greater detail in the following description of the driver electronics 25.

Figure 4:
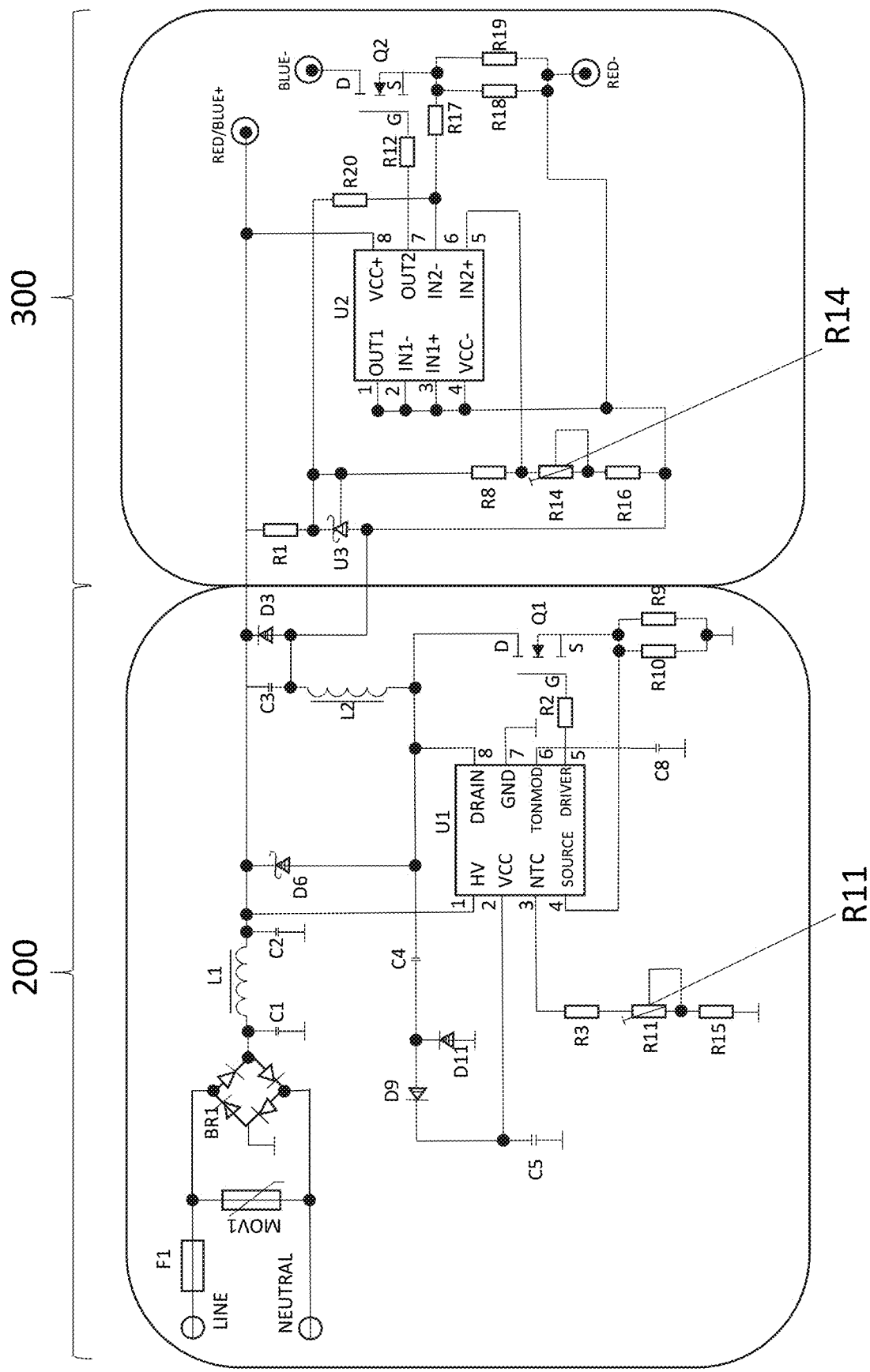
FIG. 4 is a circuit diagram for the driver electronics of a lamp consistent with the structures depicted in FIGS. 1-3, in which the driver electronics of the lamp include an AC-DC switching power supply section and a linear topology LED string current control section, in accordance with one embodiment of the present disclosure.

Referring to FIGS. 1-6, the lamp 100 further includes an driver electronics 25. In some embodiments, the two LED strings 55a, 55b are driven by the driver electronics 25 that can be positioned in the base of the two-in-one lamp 100. In some embodiments, the driver electronics 25 has two main sections: 1) the AC-DC (alternating current-direct current) power supply front section 200; and 2) the linear topology LED string current control section 300, in which the linear topology LED string current control section 300 follows the AC-DC power supply front section 200, as depicted in FIG. 4.

Figure 5:
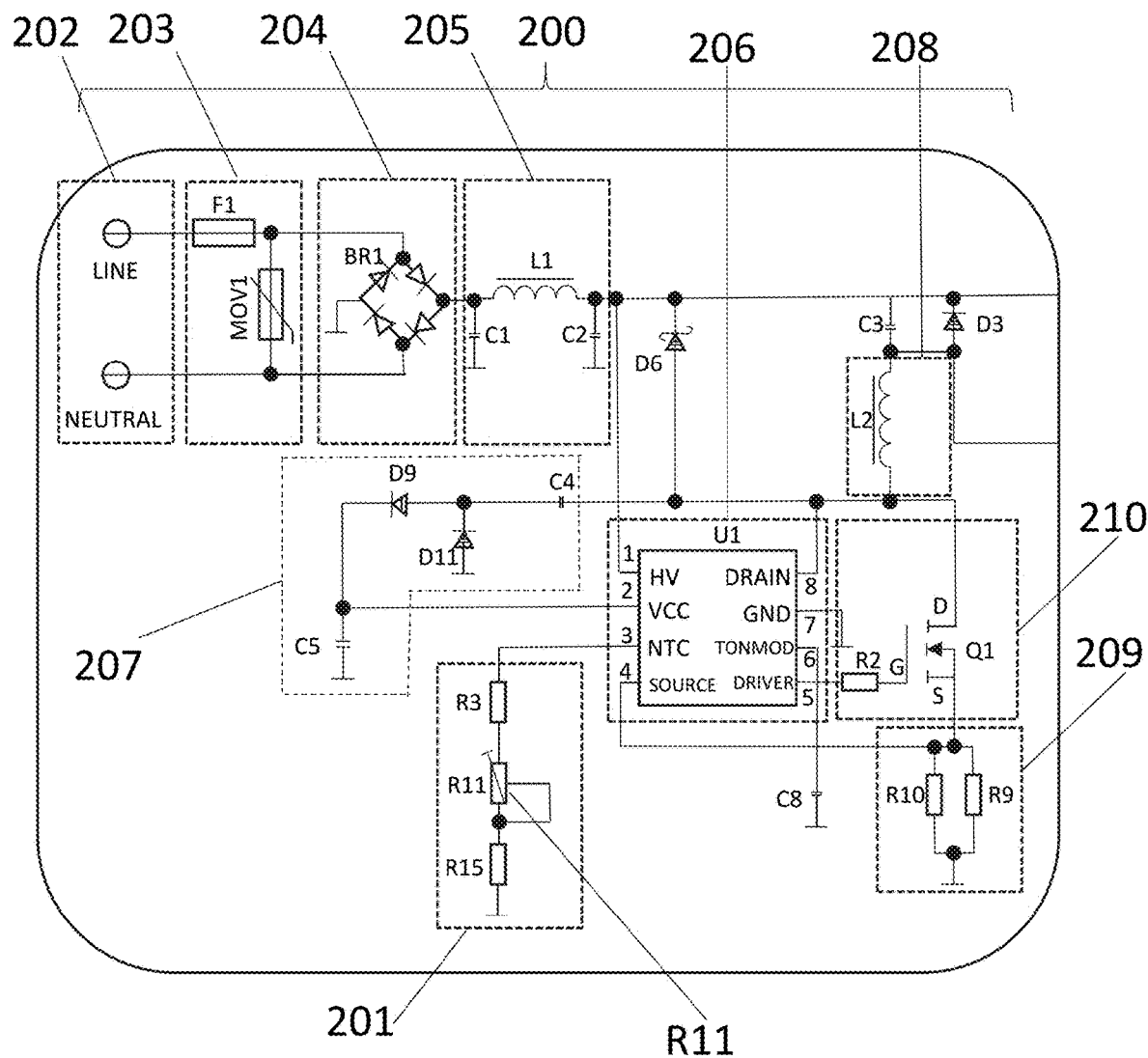
FIG. 5 is a circuit diagram of the AC-DC switching power supply section of the driver electronics, as depicted in FIG. 4.

The output of the linear topology LED string current control section 300 drives the two or more LED strings 55a, 55b that emit the required spectrum of light for plant growth. In some embodiments, the AC-DC power supply front section 200 converts a 120V alternating current (AC) line input voltage to a direct current (DC) output voltage that is suitable for the LED voltage strings, e.g., the two LED strings 55a, 55b depicted in FIGS. 1-3. Referring to FIGS. 4 and 5, the AC-DC power supply front section 200 can generate the total current as required by the LEDs 50, i.e., LEDs 50 included within the at least two LED strings 55a, 55b, to produce the necessary spectral power in the desired portions of the spectrum.

In some embodiments, the lamp 100 has the ability to change the total photosynthetic photon flux (PPF) emitted by the lamp 100, which is at least in part a function that is provided by the AC-DC power supply front end section 200. In one embodiment, the AC-DC power supply front end section 200 provides that the output current of the lamp can be adjusted from 50% to 100% using a printed circuit board (PCB) mount potentiometer that is identified with reference number R11 in FIGS. 4 and 5. It is noted that the output current being adjusted from 50% to 100% is only one example of the range of total current that the AC-DC power supply front end section 200 may set. In some other embodiments, the output current, i.e., total current, of the lamp can be adjusted from 0% to 100% using the printed circuit board (PCB) mount potentiometer that is identified with reference number R11 in FIGS. 4 and 5. The PCB mount potentiometer R11 allows control over the amount of total current, which in turn allows control over the horticultural PPF (Photosynthetic Photon Flux) metric. The AC-DC power supply front section 200 of the driver electronics 25 has a user accessible potentiometer R11 (as depicted in the circuit diagrams for the driver electronics 25 illustrated in FIGS. 4 and 5) having a selectable position switch 302, e.g., lever or dial, located on the body 10 of the lamp 100 (as depicted in the exploded and planar view of the lamp depicted in FIGS. 1 and 2. A user turning the selectable position switch 302, adjusts the resistance of the printed circuit board (PCB) mount potentiometer on the lamp that is identified with reference number R11, which adjusts the output current from the AC-DC power supply front section 200, which in turn adjusts the horticultural PPF (Photosynthetic Photon Flux) emitted by the light source, e.g., the two LED strings 55a, 55b, of the lamp 100.

The "photosynthetic photon flux (PPF)" is a measurement that determines the total amount of photosynthetically active radiation (PAR) a light gives off. The photosynthetically active radiation (PAR) of a light defines the type of light needed to support photosynthesis, while photosynthetic photon flux (PPF) determines the amount of PAR that is created by a lighting system each second. The photosynthetic photon flux (PPF) is expressed as micro moles of photons/s emitted by the lamp 100. In essence, it is the magnitude of the photosynthetic photon flux (PPF) in the different parts of the spectrum that matters for plant growth.

Plants depend on light in order to perform the crucial function of photosynthesis. Additionally, plants depend on particular wavelengths of light to make photosynthesis possible. Plants primarily use wavelengths of light between 400 to 700 nanometers to achieve successful photosynthesis (considered blue light and red light). The light within this range is called photosynthetically active radiation. The photosynthetic photon flux (PPF) represents the measurement of all the photons emitted per second (per s) in this range.

In some embodiments, the photosynthetic photon flux (PPF) of light emitted by blue light wavelength emitting LEDs 108b, e.g., LEDs emitting wavelengths ranging from 400 nm-500 nm, may range from 3.5 µmol/s to 7 µmol/s. It is noted that this is only one example, and the present disclosure is not limited to only this example. In other examples, the photosynthetic photon flux (PPF) of light emitted by blue light wavelength emitting LEDs 108b, e.g., LEDs emitting wavelengths ranging from 400 nm-500 nm, may be equal to 2.5 µmol/s, 3.0 µmol/s, 3.5 µmol/s, 4.0 µmol/s, 4.5 µmol/s, 5.0 µmol/s, 5.5 µmol/s, 6.5 µmol/s, 7.0 µmol/s, and 7.5 µmol/s, as well as any range of photosynthetic photon flux (PPF) values having a lower limit selected from one of the aforementioned examples, and having an upper limit selected from one of the aforementioned examples. For example, the photosynthetic photon flux (PPF) of light emitted by blue light wavelength emitting LEDs 108b, e.g., LEDs emitting wavelengths ranging from 400 nm-500 nm, may range from 2.5 µmol/s to 5 µmol/s.

In some embodiments, the photosynthetic photon flux (PPF) of light emitted by red light wavelength emitting LEDs 108r, e.g., LEDs emitting wavelengths ranging from 600 nm-700 nm, may range from 15 µmol/s to 30 µmol/s. It is noted that this is only one example, and the present disclosure is not limited to only this example. In other examples, the photosynthetic photon flux (PPF) of light emitted by red light wavelength emitting LEDs, e.g., LEDs emitting wavelengths ranging from 600 nm-700 nm, may be equal to 10 µmol/s, 12.5 µmol/s, 15 µmol/s, 17.5 µmol/s, 20 µmol/s, 22.5 µmol/s, 25 µmol/s, 27.5 µmol/s, 29.0 µmol/s, 30 µmol/s, 32.5 µmol/s and 35.0 µmol/s, as well as any range of photosynthetic photon flux (PPF) values having a lower limit selected from one of the aforementioned examples, and having an upper limit selected from one of the aforementioned examples. For example, the photosynthetic photon flux (PPF) of light emitted by red light wavelength emitting LEDs, e.g., LEDs emitting wavelengths ranging from 600 nm-700 nm, may range from 17.5 µmol/s to 27.5 µmol/s.

In some embodiments, the potentiometer that is identified by reference number R11 in the AC-DC (alternating current-direct current) power supply front section 200 is a portion of the driver circuit, i.e., driver electronics 25, which provides for a platform design feature of the lamp 100. By virtue of this design feature, the same lamp design can be adapted for multiple output power levels without having to make specific point designs. For example, a 20 W input power driver 25 will be fine for any lamp rating from 10 W to 20 W.

Still referring to FIGS. 4 and 5, the output current from the AC-DC power supply front section 200 leads into the linear topology LED string current control circuit 300. The linear topology LED string current control section 300 includes an operational amplifier and can control the current though each LED string 55a, 55b to control the spectrum of light emitted by the horticultural lamp. The term "linear" as used to describe the linear string current control provided by the linear string current control section 300 refers to the topology of the power supply control. Referring to FIGS. 4 and 5, the current to the first and second strings of LEDs 55a, 55b, passes through a transistor (identified by reference number Q2), e.g., metal oxide semiconductor field effect transistor (MOSFET). By "linear" it is meant that the linear string current control section 300 is operating the transistor Q2, located in the current control section, in the linear region of the transistors Q2 operational range. The transistor identified by reference number Q2 can be a field effect transistor (FET). As used herein a "field effect transistor (FET)" is a transistor in which output current, i.e., source-drain current, is controlled by the voltage applied to the gate (G). A field effect transistor has three terminals, i.e., gate (G), source (S) and drain (D). Referring to FIG. 8, the linear region of operation 500 for the transistor begins once the gate (G) is charged to the threshold level 501, and the FET is ready to carry current, to the Miller plateau level 502. Within the linear interval of operation 500, the current between the source (S) and drain (D) of the device is proportional to the gate (G) voltage. The term linear does not refer to the fact that the LED string current is controlled linearly by the potentiometer rotation.

Figure 6:
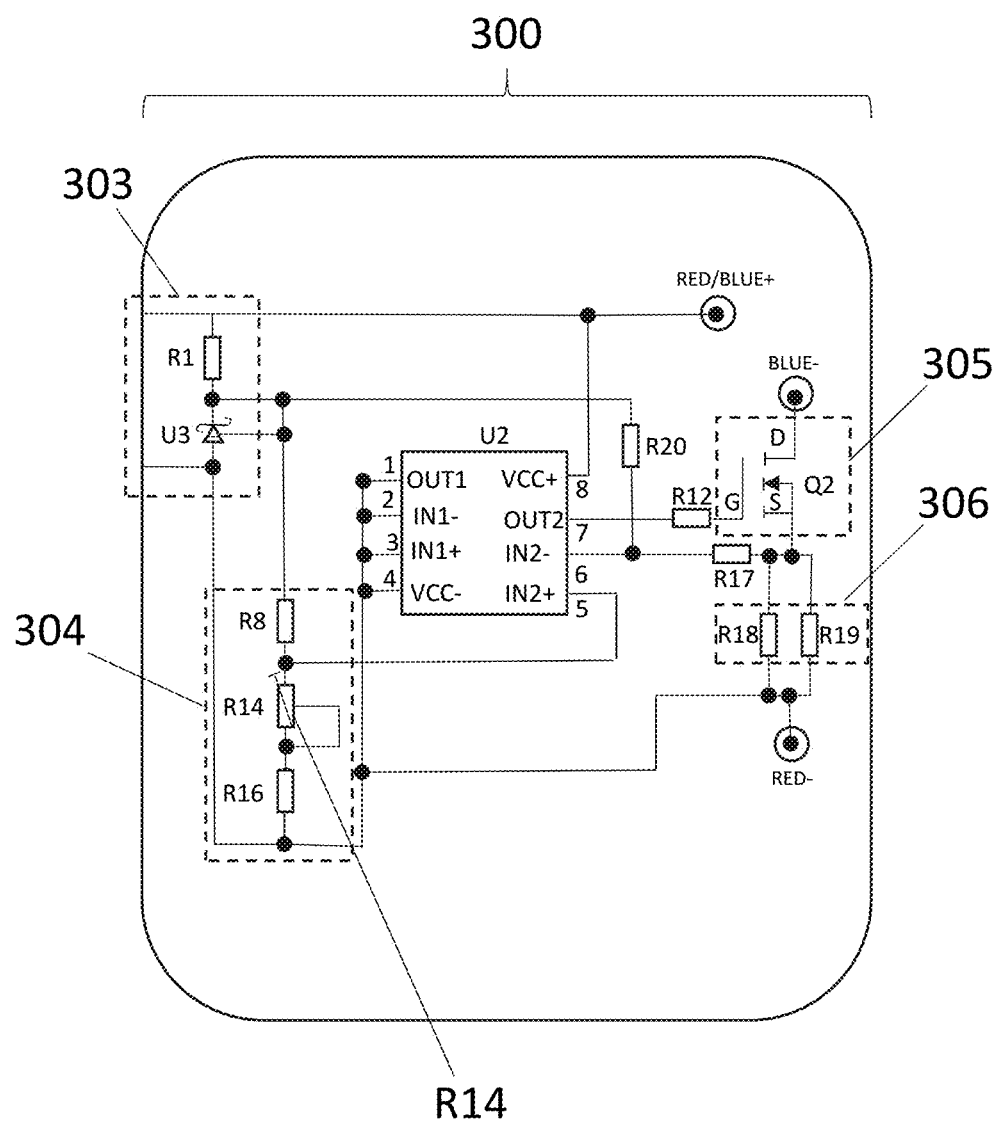
FIG. 6 is a circuit diagram of the linear topology LED string current control section of the driver electronics, as depicted in FIG. 4.

The linear topology LED string current control circuit 300 of the driver electronics 25 has a user accessible potentiometer R14 (as depicted in the circuit diagrams for the driver electronics 25 illustrated in FIGS. 4 and 6) having a selectable position switch 301, e.g., lever or dial, located on the body 10 of the lamp 100 (as depicted in the exploded and planar view of the lamp depicted in FIGS. 1 and 2. For example, the potentiometer identified by reference number R14 is in electrical communication with the operational amplifier U2 in the linear string control circuit 300 of the driver electronics 25 is to control the percentage of the total current from the AC-DC switching power supply section 200 that will flow through the LED strings 1 and 2, i.e., the first LED string 55a and the second LED string 55b. The sum of these percentages has to be 100. LED String 1 (first LED string 55a) can have a current percentage varying from 0% to 100% of the total current and the same applies to LED String 2 (second LED string 55b).

Referring to FIGS. 1-6, the current from the linear string current control circuit 300 of the driver electronics 25 then powers the light source of the lamp 100, i.e., the LEDs 108b, 108r of the first and second strings of LEDs 55a, 55b. In one example, LED string 1 (identified by reference number 55a) is made of red light emitting LEDs and LED string 2 (identified by reference number 55b) is made up of blue light emitting LEDs. Of the total current that the AC-DC switching power supply can supply, 0% to 100% of the current can be passed to LED string 1 or LED string 2. The potentiometer R14 controls the amount of current that goes through LED string 1. The string current control circuit, i.e., linear topology LED string control circuit 300, operates such that the total power supply current minus the current set for LED string 1 (identified by reference number 55a in FIG. 3) via the potentiometer R14, will flow through LED string 1. For example, if the total power supply current is 750 mA and the potentiometer R14 is set for 100 mA through LED string 1, the balance of the current or 750 mA-100 mA or 650 mA will flow through the LED string 2 (identified by reference number 55b in FIG. 3). If the potentiometer R14 is set to 0% current through LED string 1, all of the current, i.e., 100% of the current, from the power supply, i.e., from the AC-DC power supply front section 200, will flow through the LED string 2. If the potentiometer R14 is set to 100% current through LED string 1, 0% current will flow through LED string 2. This enables the lamp 100 to emit only in the blue, the ability to monotonically reduce blue and increase red and the ability to change to all red emission.

In one example, as the user rotates the selectable position switch 301 from all the way left to all the way right, to adjust the potentiometer R14 so that the output LED string current changes from 100% for the blue LED string current (current through second string of LEDs 55b) (which translates to 0% for the red LED string current) to 100% for the red LED string current (current through first string of LEDs 55a) (which translates to 0% for the blue LED string current). In some embodiments, this can provide the user with complete flexibility in setting the emission from the lamp 100 to any ratio of red to blue as desired during the growth cycle of the plant.

Each of the linear topology LED string control section 300 and the AC-DC power supply front section 200 include a potentiometer for user controlled adjustments without using a microcontroller. The term "potentiometer" denotes at least a two-terminal resistor, e.g., a three-terminal resistor, with a sliding or rotating contact that forms an adjustable voltage divider. The potentiometers used in the driver electronics 25, e.g., the AC-DC power supply front section 200 and linear topology LED string current control circuit 300, operated by a mechanism can be used as position transducers, for example, a selectable position switch 301, 302 such as a dial, lever, slider, joystick or a combination thereof.

Figure 7:
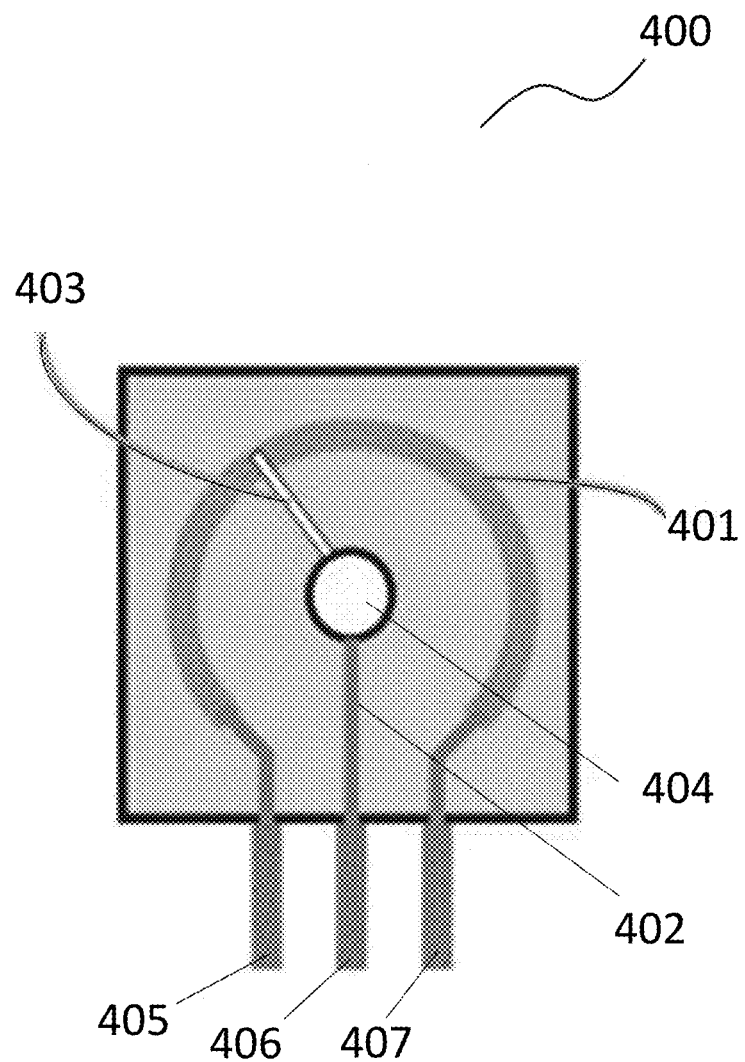
FIG. 7 is an illustration of one embodiment of a potentiometer that can be used in at least one of the AC-DC switching power supply section and the linear topology LED string current control section of the driver electronics, as depicted in FIGS. 4-6.

FIG. 7 illustrates one embodiment of a potentiometer 400 that can be employed for the potentiometers identified by reference numbers R11 in the AC-DC power supply front section 200 and R14 in the linear topology LED string current control section 300. In one example, the potentiometer 400 has two strips, i.e., a resistive strip 401 and a conductive strip 402. In one example, the resistive strip 401 is made of carbon and is responsible for potentiometer's resistance variance feature. Conductive strip helps the potentiometer to carry the current into the circuit in accordance with the resistance.

Referring to FIG. 7, the potentiometer 400 may include three lugs, which are numbered 405 (lug 1), 406 (lug 2), and 407 (lug 3). The potentiometer 400 may also include a shaft 404, which can be provided by a plastic and/or metallic stick which is used to turn the potentiometer 400. The shaft 404 may be connected to a selectable position switch, such as the selectable position switches identified by reference numbers 301. For example, when the selectable position switch 301 includes a rotatable dial, turning the selectable position switch rotates the shaft 404. The resistive strip 401 can be a carbon strip that is printed on a phenolic strip. There are metal contacts in the end to connect it to the lugs 405, 407. The metal wiper is identified by reference number 403, and when the shaft 404 is rotated, it in turn rotates the metallic wiper 403, which connects the lug 1 (identified by reference number 405) and lug 2 (identified by reference number 406). The metallic wiper 403 acts as a conducting path between the lug 1 and lug 2. So the resistance between the lug 1 (identified by reference number 405) and the center lug, i.e., lug 2 (identified by reference number 406), is the resistance of the part of carbon strip over which the metallic wiper has traversed. In this embodiment, rotating the shaft 404 of the potentiometer 400 rotates the metallic wiper 403 attached to it and hence changes the resistance. In this way the potentiometer 400 acts as a variable resistance. The variable resistance is not necessarily adjusted using a thumb pot or dial, as depicted in FIG. 7. The thumb pot/dial allows for rotational adjustment by a user. FIGS. 1 and 2 illustrate dials, i.e., selectable position switches 301, 302, engaged to the shaft 404 of the potentiometers that provide R11 and R14 in FIGS. 4-6. For example, the geometry of the elements that provide the variable resistance can be adjusted to provide a slide pot/slider pot, in which a potentiometer that is adjusted by sliding the wiper left or right (or up and down, depending on the installation), usually with a finger or thumb.

Referring to FIGS. 1-3, the lamp includes one or more light engines, i.e., sets of solid state emitters, e.g., light emitting diodes (LEDs), that emit light in accordance with the aforementioned adjustments of the photosynthetic photon flux (PPF) via adjustments to potentiometer R11, and adjustments to the percentage of wavelengths of light emitted by the light engine via adjustments of potentiometer R14. Current from the linear string control circuit 300 of the driver electronics 25 is received by the light engine of the lamp 100.

FIG. 3 depicts one embodiment of a light engine configuration including a plurality of solid state light emitter, e.g., first string of light emitting diodes 55a and second string of light emitting diodes 55b, which provides the light source suitable for horticultural lighting for the lamp 100. The LEDs that provide the two strings of LEDs 55a, 55b can be mounted to the circuit board 60 by solder, a snap-fit connection, or other engagement mechanisms. In some examples, the LEDs are provided by a plurality of surface mount device (SMD) light emitting diodes (LED). The circuit board 60 for the light source 50 may be composed of a metal core printed circuit board (MCPB). MCPCB uses a thermally conductive dielectric layer to bond circuit layer with base metal (Aluminum or Copper). In some embodiments, the MCPCB use either Al or Cu or a mixture of special alloys as the base material to conduct heat away efficiently from the LEDs thereby keeping them cool to maintain high efficacy. In some cases, in addition to the two strings of LEDs 55a, 55b, the printed circuit board (PCB)) 60 may further include other componentry populated there over, such as, for example, resistors, transistors, capacitors, integrated circuits, and power and control connections for a given emitter, i.e., light emitting diode (LED) 108b, 108r, to name a few examples.

As depicted in FIG. 3, the light source 50 may include two strings of LEDs 55a, 55b that are mounted on a single circuit board 60. When referring to a "string" of LEDs it is meant that each of the LEDs in the string are illuminated at the same time in response to an energizing act, such as the application of electricity from the driving electronics, e.g., driver 25, in the lamp 100. The LEDs in a string of LEDs are electrically connected for this purpose. For example, when the first string of LEDs 55a is energized for illumination, all of the LEDs in the string are illuminated. Further, in some embodiments, illuminating the first string of LEDs 55a does not illuminate the LEDs in the second string of LEDs 55b, and vice versa, as they are independently energized by the driving electronics 25, and not electrically connected. As depicted in FIG. 2, each of the LED strings 55a, 55b are connected by an electrical pathway 56a, 56b, which may be a wire, but is not necessarily a wire. Although there is a single positive contact 57 provided to both electrical pathways 56a, 56b to the first and second strings of LEDs 55a, 55b, there is a separate negative contact 58a, 58b for each of the electrical pathways 56a, 56b to the first and second strings of LEDs 55a, 55b.

In accordance with some embodiments, a given light emitting diode (LED) 108b, 108g, 108r as employed in the first and second string of light emitting diodes (LEDs) may be a semiconductor light source, such as a light-emitting diode (LED), an organic light-emitting diode (OLED), or a polymer light-emitting diode (PLED), among others. Regarding output, a given light emitting diode (LED) 108b, 108r may be configured to emit electromagnetic radiation (e.g., light) from any one, or combination, of spectral bands, such as, for example, the visible spectral band, the infrared (IR) spectral band, and the ultraviolet (UV) spectral band, among others. The quantity, density, and spacing between neighboring emitters over PCB 60 may be customized, as desired for a given target application or end-use.

In accordance with some embodiments, such as the example embodiment shown in FIG. 3, the light engine 50 may include: (1) a first sub-set of emitters 108r configured to emit light of a first sub-set of wavelengths (e.g., red light)(as provided by the first string 55a of LEDs); and (2) a second sub-set of emitters 108b configured to emit light of a different second sub-set of wavelengths (e.g., blue light)(as provided by the second string 55b of LEDs). In at least one example embodiment, the first string of LEDs 55a includes eight red light emitting diodes 108r, and the second string of LEDs 55b includes four blue light emitting diodes 108b. In another embodiment, the second string of LEDs 55b includes 3 blue light emitting diodes and one green light (emitting light wavelengths ranging from 500 nm to 600 nm) emitting diode. In yet another embodiment, the second string of LEDs 55b includes 2 blue light emitting diodes and 2 green light (emitting light wavelengths ranging from 500 nm to 600 nm) emitting diodes.

In accordance with some embodiments, the light engine 50 may include one or more light emitting diodes (LEDs) 108b, e.g., the LEDs 108b in the second string of LEDs 55b, configured to emit light having wavelength(s) in the range of about 400-500 nm (e.g., generally blue light). In some such cases, a given light emitting diode (LED) 108b may be configured to emit light having a local emission peak at a wavelength between 440-460 nm. In some embodiments, the photosynthetic photon flux (PPF) of light emitted by blue light wavelength emitting LEDs 108b may range from 3.5 µmol/s to 7 µmol/s.

In accordance with some embodiments, the light engine 50 may include one or more light emitting diodes (LEDs) 108r, e.g., the LEDs 108r in the first string of LEDs 55a, configured to emit light having wavelength(s) in the range of about 600-700 nm (e.g., generally red light). In some such cases, a given light emitting diodes (LEDs) 108r may be configured to emit light having a local emission peak at a wavelength between 630-680 nm. In some embodiments, the photosynthetic photon flux (PPF) of light emitted by red light wavelength emitting LEDs 108r may range from 15 µmol/s to 30 µmol/s.

The quantity, density, and spacing between neighboring emitters for a given string may be customized. Also, the quantity of emitters, e.g., LEDs, of each color may be customized. In addition, the electrical power (wattage) of each individual emitter may be customized to achieve a given desired SPD, and the present disclosure is not intended to be limited only to the example configuration depicted via FIG. 3.

It is noted that above example for the LEDs 108b, 108r in the first and second strings of LEDs 55a, 55b is provided for illustrative purposes only, and is not intended to limit the present disclosure. A given emitter, e.g., LED 108b, 108r, may be configured for emissions of a single correlated color temperature (CCT) or for color-tunable emissions, as desired. For example, one or more of the blue LEDs 108b may be substituted with an LED that emits a green wavelength light, e.g., emit green light having a wavelength from 500 nm to 600 nm. In one example, one or more of the blue LEDs 108b may be substituted with an LED that emits a green wavelength light, e.g., emit green light having a wavelength from 540 nm to 560 nm. Thus, and in accordance with some embodiments, a given emitter may be configured to emit any one, or combination, of blue, green, and red light. Also, the electrical power (wattage) of a given emitter may be customized, as desired for a given target application or end-use. In some cases, a given emitter may be a medium-power semiconductor light source having a wattage of about 1 W or less (e.g., about 0.25 W or less, about 0.5 W or less, about 0.75 W or less, or any other sub-range in the range of about 1 W or less). In some cases, a given emitter may be a high-power semiconductor light source having a wattage of about 1 W or greater (e.g., about 1.25 W or greater, about 1.5 W or greater, or any other sub-range in the range of about 1 W or greater). Other suitable configurations for emitters will depend on a given application and will be apparent in light of this disclosure.

The arrangement of emitters, e.g., the LEDs 108b, 108r in the first and second strings of LEDs 55a, 55b, over PCB 60 may also be customized, as desired for a given target application or end-use. For instance, in some embodiments, emitters may be distributed, in part or in whole, as a regular array in which all (or some sub-set) of emitters, e.g., the LEDs 108b, 108r, are arranged in a systematic manner in relation to one another over PCB 110. The arrangement of LEDs, or other solid state light emitters of the light source 50, over the circuit board 60 may be customized, as desired for a given target application or end-use. In the embodiment that is depicted in FIG. 3, the LEDs interconnected to provide first and second strings of LEDs 55a, 55b may be arranged, e.g., concentrically, about the center region of circuit board 60, and LEDs, i.e., solid state light emitters, may be arranged, e.g., concentrically, about the perimeter region of circuit board 60. The quantity, density, and spacing between neighboring LEDs that provide the first and second string 55a, 55b on the circuit board 60 may be customized, as desired for a given target application or end-use. For example, a grid distribution may also be employed for arranging the LEDs, i.e., solid state light emitters, of the light source 50. Although in some instances the LEDs, i.e., solid state light emitters, may be equally spaced from one another, this is not necessary, as embodiments have been contemplated in which higher density regions of LEDs, i.e., solid state light emitters, are present on a specific portion of a circuit board 60 in comparison to the remainder of the circuit board 60.

Additionally, although the present description refers to only two strings of LEDs 55a, 55b in describing some embodiments of the lamp 100, the lamp 100 is not limited to only two strings of LEDs 55a, 55b, so long as one of the groupings of LEDs 55a, 55b emits wavelengths of light that provide the spectral power distribution (SPD) of a horticultural lamp, and a horticultural PPF (Photosynthetic Photon Flux). For example, the number of strings of LEDs, i.e., number of strings of solid state light emitters, may be equal to 2, 3, 4, 5, 6, 7, 8, 9, 10 and 15, as well as any range for the number of strings of LEDs having a lower endpoint to the range that is provided by one of the aforementioned examples, and having an upper endpoint to the range that is provided by one of the aforementioned examples.

It is also noted that although the specific example depicted in FIG. 3 illustrates a first string of LEDs 55a of eight (8) LEDs in the string; and a second string of LEDs 55b that includes four (4) LEDs in the string, the first and second strings of LEDs 55a, 55b are not limited to only these example numbers of LEDs. In some examples, the number of LEDs in the any string of LEDs, such as the first and second string 55a, 55b, may be equal to 4, 5, 6, 7, 8, 9, 10, 11, 12, 13, 14, 15, or 20, as well as any range for the number of LEDs in the string including one of the aforementioned examples as a lower endpoint of the range, and one of the aforementioned examples as an upper endpoint of the range.

The lamp 100 can optionally include a heatsink portion 45 configured to be in thermal communication with light engine 50 to facilitate heat dissipation for the lamp 100. To that end, optional heatsink portion 45 may be of monolithic or polylithic construction and formed, in part or in whole, from any suitable thermally conductive material. For instance, optional heatsink portion 45 may be formed from any one, or combination, of aluminum (Al), copper (Cu), gold (Au), brass, steel, or a composite or polymer (e.g., ceramics, plastics, and so forth) doped with thermally conductive material(s). The geometry and dimensions of optional heatsink portion 45 may be customized, as desired for a given target application or end-use. In some instances, a thermal interfacing layer (e.g., a thermally conductive tape or other medium) optionally may be disposed between heatsink portion 45 and light engine 50 to facilitate thermal communication there between. Other suitable configurations for optional heatsink portion 45 and optional thermal interfacing layer will depend on a given application.

As will be appreciated in light of this disclosure, lamp 100 may further include or otherwise have access to any of a wide range of other electronic components employable with solid-state lamps and luminaires. For instance, in some embodiments, lamp 100 may include or otherwise have access to communication componentry (e.g., such as a transmitter, a receiver, or a transceiver) configured for wired or wireless communication (or both) utilizing any suitable means, such as Universal Serial Bus (USB), Ethernet, FireWire, Wi-Fi, Bluetooth, Bluetooth Mesh, ZigBee, or a combination thereof, among others. In some embodiments, lamp 100 may include or otherwise have access to processing componentry, such as a central processing unit (CPU) or a microcontroller unit (MCU), among others.

In accordance with some embodiments, lamp 100 may include or otherwise have access to one or more module controllers configured to be operatively coupled with emitters, e.g., the first and second string of LEDs 55a, 55b. These module controllers are additional to the control provided by the adjustment of the potentiometer R11 that adjusts the output current from the AC-DC power supply front section 200 of the electronics driver, which in turn adjusts the horticultural PPF (Photosynthetic Photon Flux) emitted by the light source, e.g., the two LED strings 55a, 55b, of the horticultural lamp 100; and these controls are additional to the control provided by the adjustment of the potentiometer R14 in the linear topology LED string control circuit 300 of the driver electronics 25 is to control the percentage of the total current from the AC-DC switching power supply section that will flow through the first and second LED strings, which in turn affects the spectral power distribution (SPD) of the horticultural lamp 100.

In some cases, a given module controller may be native to lamp 100 or native to a given emitter, e.g., LED 108b, 108r, whereas in some other cases, a given controller may be native to a luminaire configured to be operatively coupled with lamp 100. The emitters 108b, 108r of lamp 100 may be electronically controlled to provide lamp 100 with highly adjustable light emissions, in accordance with some embodiments. A given module controller may host one or more lighting control modules and may be programmed or otherwise configured to output one or more control signals that may be utilized in controlling the operation of a given emitter 108b, 108r of lamp 100, in accordance with some embodiments. For instance, in some embodiments, a given controller may include an intensity adjustment module and may be configured to output control signal(s) to control the intensity (e.g., brightness or dimness) of the light emitted by a given emitter 108b, 108r. In some embodiments, a given controller may include a color adjustment module and may be configured to output control signal(s) to control the color (e.g., wavelength) of the light emitted by a given emitter 108. In some embodiments, a given controller may be configured to output control signal(s) for use in controlling whether a given emitter 108 is in an on state or an off state. It should be noted, however, that the present disclosure is not intended to be limited only to these example lighting control modules and output signals. Additional and/or different lighting control modules and output signals may be provisioned, as desired for a given target application or end-use. Numerous variations and configurations will be apparent in light of this disclosure.

In accordance with some embodiments, the module(s) of a given module controller can be implemented in any suitable standard, custom, or proprietary programming language, such as, for example, C, C++, objective C, JavaScript, or any other suitable instruction set, as will be apparent in light of this disclosure. The module(s) of a given module controller can be encoded, for example, on a machine-readable medium that, when executed by a processor, carries out the functionality of lamp 100, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments of the module controller can be implemented with a microcontroller having input/output capability (e.g., inputs for receiving user inputs; outputs for directing other components) and a number of embedded routines for carrying out device functionality. In a more general sense, the functional modules of a given module controller can be implemented in any one, or combination, of hardware, software, and firmware, as desired for a given target application or end-use.

The horticultural lamp of the present disclosure allows for user adjustments to the light emitted from the lamp for photosynthetic photon flux (PPF) and spectral power distribution (SPD) of the horticultural lamp 100 using driver electronics 25 composed of a lower cost circuit including potentiometers R11, R14 based on an operation amplifier (OPAMP) arrangement, the driver electronics 35 having a lower cost circuit when compared to similar microelectronic configurations including microcontrollers.

The driver electronics 25 of the present lamp 100 do not have the constraint of the LED string voltages needing to be the same for all the strings of LEDs, e.g., the first string of LEDs 55a and the second string of LEDs 55b. This is a requirement of similar lamp designs including microcontrollers to control the light emission from the light engine. In the driver electronics 25 of the present lamp 100, the potentiometer identified by R11 in FIGS. 4-6 provides for control over the amount of total current, which in turn allows control over the horticultural PPF (Photosynthetic Photon Flux) metric. In the driver electronics 25 of the present lamp 100, the potentiometer identified by R11 in FIGS. 4-6 can be used as a platform design. For example, by virtue of this design feature, the same lamp design can be adapted for multiple output power levels without having to make specific point designs. For example, a 20 W input power driver will be fine for any lamp rating from 10 W to 20 W.

The following examples are provided herein for illustrative purposes and to further detail some aspects of the present disclosure. The examples provided herein are not intended to limit the present invention to only these detailed examples.

Example Circuit for AC-DC Switching Power Supply Section of the Electronic Driver In one example, the driver electronics 25 have two sections, i.e., the AC-DC switching power supply front end section 200 followed by the linear topography LED string current control section 300. The AC-DC switching power supply front end section 200 converts the 120 AC line input voltage to the required DC output voltage that is suitable for the LED voltage strings. The AC-DC switching power supply front end section 200 generates the total current as required by the LEDs voltage strings 55a, 55b. The total current provided by the AC-DC switching power supply front end section 200 can be controlled through adjustments to the potentiometer having reference number R11. The potentiometer having reference number R11 in the AC-DC switching power supply front end section 200 of the driver electronics 25 allows control over the amount of total current to the LEDs 108b, 108r, which in turn allows control over the horticultural PPF (Photosynthetic Photon Flux) metric. The potentiometer having reference number R11 in the AC-DC switching power supply front end section 200 of the driver electronics 25 allows for the electronic derive to be used as a platform design. By virtue of this design feature, the same lamp design can be adapted for multiple output power levels without having to make specific point designs. For example, a 20 W input power driver will be fine for any lamp rating from 10 W to 20 W. Further details of the AC-DC switching power supply front end section 200 of the driver electronics 25 are now discussed with reference to FIG. 5.

FIG. 5 is a circuit diagram of the AC-DC switching power supply section 200 of the driver electronics 25 that are depicted in FIG. 4. AC power is supplied by electrical communication from the base 15 of the lamp 100 to the AC input circuit 202 portion of the AC-DC switching power supply section 200 of the driver electronics 25. In one example of operation, the AC input circuit 202 allows for a 120V input to be applied to terminals having reference letters L (Live) and N (Neutral), as depicted in FIG. 5. A circuit protection portion 203 of the AC-DC switching power supply section 200 is present following the AC input circuit 202 portion. In one example, the circuit protection portion 203 includes a fuse identified by F1 that can be used for protection against input over current in the event of any fault due to component failures in the lamp driver electronics 25 circuit. The circuit protection portion 203 also includes a metal oxide varistor identified by MOV1 that can be used to protect the lamp 100 from failure against line transients.

Referring to FIG. 5, the AC-DC switching power supply section 200 of the driver electronics 25 also include an EMI filter circuit 205 portion. An inductor identified by L1 and capacitors (identified by C1 and C2) form an EMI-filter to limit the conducted emissions from the lamp to be within the US FCC part 15 class B limits. An EMI filter, or electromagnetic interference filter, is an electronic passive device that can be used in order to suppress conducted interference that is present on a signal or power line. The Federal Code Of Regulation (CFR) FCC Part 15 is a common testing standard for most electronic equipment. FCC Part 15 covers the regulations under which an intentional, unintentional, or incidental radiator can be operated without an individual license. FCC Part 15 covers as well the technical specifications, administrative requirements and other conditions relating to the marketing of FCC Part 15 devices. Depending on the type of the equipment, verification, declaration of conformity, or certification is the process for FCC Part 15 compliance. FCC Part 15 Subpart B is for unintentional radiators.

An AC to DC rectifying circuit 204 portion is present between the circuit protection portion 202, and the EMI filter circuit 205 portion. The AC to DC rectifying circuit portion 204 rectifies the AC line voltage to DC output. For example, the AC to DC rectifying circuit portion 204 may include a full bridge rectifier identified by BR1 to rectify the AC line voltage to a DC output that is required by the LED strings, e.g., first and second strings 55a, 55b of LEDs.

Figure 9:
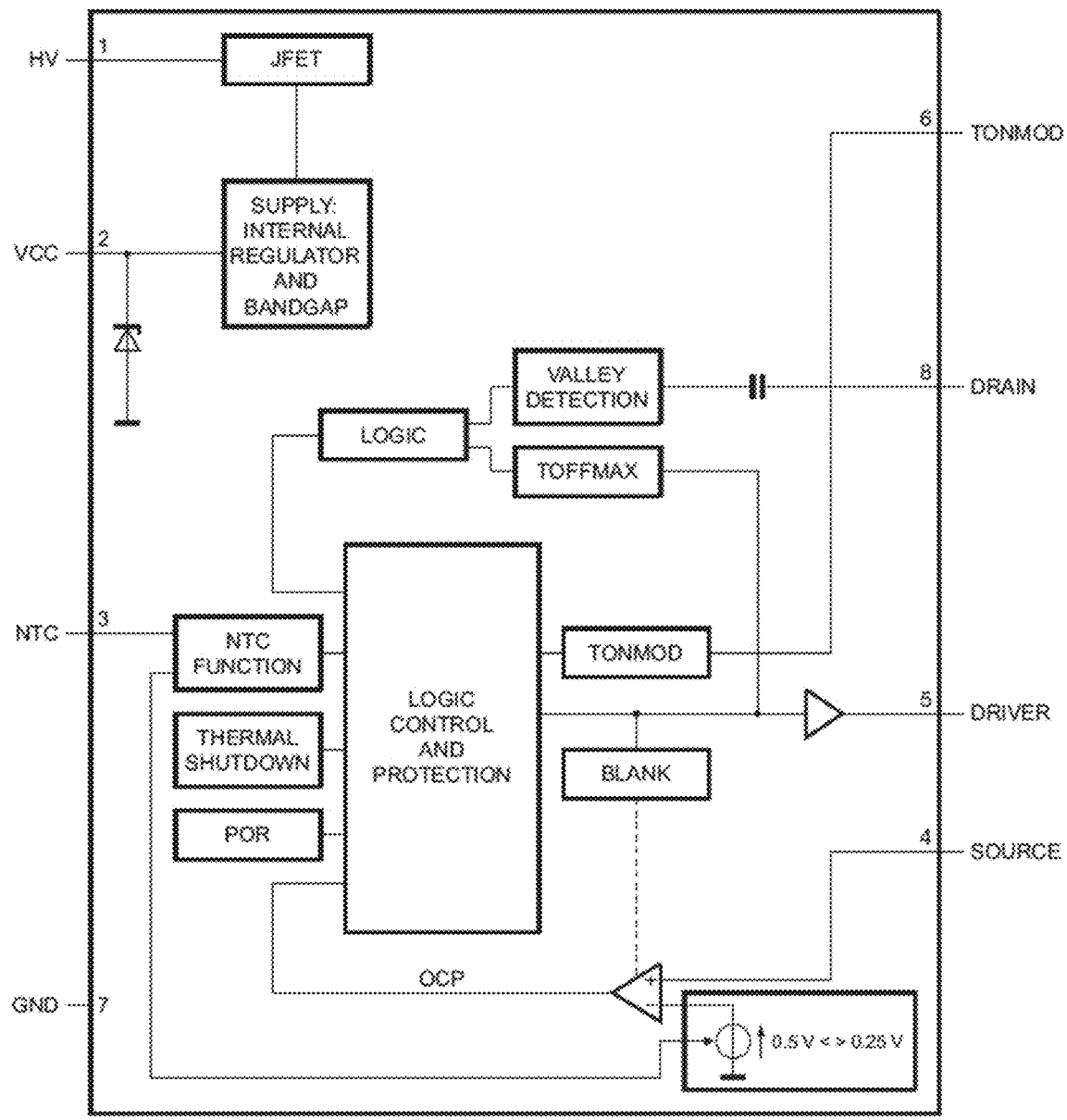
FIG. 9 is a block diagram illustrating some components of the control integrated circuit (IC) used in the AC-DC switching power supply section, in accordance with one embodiment of the present disclosure.

Referring to FIG. 5, the rectified DC is fed to a DC-to-DC power converter circuit 206 portion of the AC-DC switching power supply section 200 of the driver electronics 25. In one example, the DC to DC power converter 206 is a buck converter based on the controller integrated circuit (IC) identified by U1 operating in a critical conduction mode. FIG. 9 illustrates one example of a block diagram for the controller integrated circuit (IC) identified by U1. Pin 1 of the controller integrated circuit (IC) depicted in FIG. 9 is a high voltage (HV) supply; pin 2 is the supply voltage (VCC); pin 3 is for temperature protection input (NTC); pin 4 is a low side external switch (SOURCE); pin 5 is for driver output (DRIVER); pin 6 is for on-time modulation input (TONMOD); pin 7 is ground (GND), and pin 8 is for a high side external switch (DRAIN).

In one example, the controller integrated circuit (IC) identified by U1 in FIG. 5 and illustrated in FIG. 9 is a dimmable LED driver IC having part number SSL2129AT and being available from NXP semiconductors N.V. It is noted that the above example for the controller integrated circuit (IC) identified by U1 in FIG. 9 is provided for illustrative purposes, and is not intended to limit the present disclosure.

Any similar IC that is suitable for buck conversion, i.e., buck converter, could also be used for the control integrated circuit (IC) identified by U1. A buck converter (step-down converter) is a DC-to-DC power converter that steps down voltage (while stepping up current) from its input (supply) to its output (load). It is a class of switched-mode power supply (SMPS) typically containing at least two semiconductors, such as diodes and/or transistors, and at least one energy storage element, a capacitor, inductor, or the two in combination. To reduce voltage ripple, filters made of capacitors (sometimes in combination with inductors) are normally added to such a converter's output (load-side filter) and input (supply-side filter). In some other embodiments, other topologies like buck boost or fly back may be employed along with alternate controller integrated circuits (ICs) for the controller integrated circuit (IC) identified by U1 in FIG. 5.

Referring to FIG. 5, the AC-DC switching power supply section 200 of the driver electronics 25 also include an switch circuit portion 210. In some embodiments, the switch circuit portion 210 includes a transistor, such as the field effect transistor (FET) identified by reference number Q1. The field effect transistor (FET) identified by reference number Q1 is a switching element of the buck converter section. Its function is to act as a switch to provide a path for current for charging of the inductor L2. This switch controls, turn ON and OFF of the current into the buck inductor L2. When the switch is ON current flows into the inductor L2, and the energy is stored in the inductor L2. When the switch is OFF, the current flows out of the inductor L2 and the energy discharged from the inductor L2 to the output into the LEDs.

Still referring to FIG. 5, resistors identified with R9 and R10 are current sense resistors in a feedback portion 209 of the circuit, which provide the feedback of the current through the field effect transistor (FET) identified by Q1 so that the peak current can be controlled. In some embodiments, the zener value of the diode identified by D3 determines the output voltage threshold when the overvoltage protection is activated in the event of an output open circuit.

The AC-DC switching power supply section 200 of the driver electronics 25 may include an electrical energy storage circuit 208 portion that is connected to the drain of the field effect transistor (FET) identified by Q1. The energy storage circuit 207 portion may include an inductor identified by L2. The inductor identified by L2 is a power inductor that stores the energy during the ON state of the field effect transistor (FET) (identified by Q1) and releases the energy to the output during the OFF state of the field effect transistor (FET) (identified by Q1).

Diodes D9, D11 and capacitors C4, CS form the power supply circuit 207 for powering the integrated circuit (IC) identified by U1. The power supply circuit 207 is connected to the integrated circuit (IC) through pin 2 for the supply voltage (VCC) to the IC, as depicted in FIGS. 5 and 9.

The gate of the FET Q1 of the switch circuit portion 210 is driven by the controller integrated circuit (IC) identified by U1 based on the input voltage and the LED load connected to the converter output. The gate of the FET Q1 is connected to the driver output (DRIVER) pin 4 of the integrated circuit (IC) identified by U1, as depicted in FIGS. 5 and 9. The rectified input voltage is provided to pin 1 of the IC identified by U1 that is depicted in FIGS. 5 and 9, which is the high voltage (HV) supply. Pin 1 is in electrical communication with the AC to DC rectifying circuit portion 204 of the AC-DC switching power supply section 200 of the driver electronics 25.

Capacitor C8 is used to limit the maximum turn ON time of the IC identified by U1. This can contribute to limiting the peak current through the inductor L2 and also limit the total output power.

Referring to FIG. 5, the potentiometer having reference number R11 allows control over the amount of total current, which in turn allows control over the horticultural photosynthetic photon flux (PPF) metric, and may be referred to as the total current/photosynthetic photon flux adjustment circuit 201 of the AC-DC switching power supply front end section 200 of the driver electronics 25. The potentiometer identified by reference number R11 can be adjusted by user applied adjustments to the selectable position switch 302, e.g., lever or dial, located on the body 10 of the lamp 100 (as depicted in the exploded and planar view of the lamp depicted in FIGS. 1 and 2. Referring back to FIG. 5, in one example, the potentiometer identified by reference number R11 may be part number 3310C-101-502L provided by Bourns Inc. having an adjustable resistance ranging from 0Ω to 5K Ω.

Adjustments actuated through the potentiometer R11, e.g., manipulation of the selectable position switch 302 mechanically connected to potentiometer R11, can provide that the output current of the lamp be adjusted from 50% to 100%. By virtue of this adjustment of the output current, the horticultural photosynthetic photon flux (PPF) range for blue light emitting diodes (LEDs), such as the example of blue light emitting diodes 108b in the second string of LEDs 55b described with reference to FIG. 3, can range from 3.5 to 7 μmol/s; and the horticultural photosynthetic photon flux (PPF) range in the red light emitting diodes (LEDs), such as the example of red light emitting diodes 108r in the first string of LEDs 55a described with reference to FIG. 3, can range from about 15 μmol/s to 30 μmol/s. The potentiometer R11 along with the resistors identified by R3 and R15 provide that the total current/photosynthetic photon flux adjustment circuit 201 of the AC-DC switching power supply front end section 200 be connected to the DC-to-DC power converter circuit 206 portion of the AC-DC switching power supply section 200. In one example, the resistor identified by R3 may have a resistance of 70Ω. In one example, the resistor identified by R3 can have part number RC0603JR070RP, and is available from Yageo Corporation. In one example, the resistor identified by R15 may have a resistance of 320Ω. In one example, the resistor identified by R3 can have part number RT0603DRE07320RL, and is available from Yageo Corporation.

Figure 10:
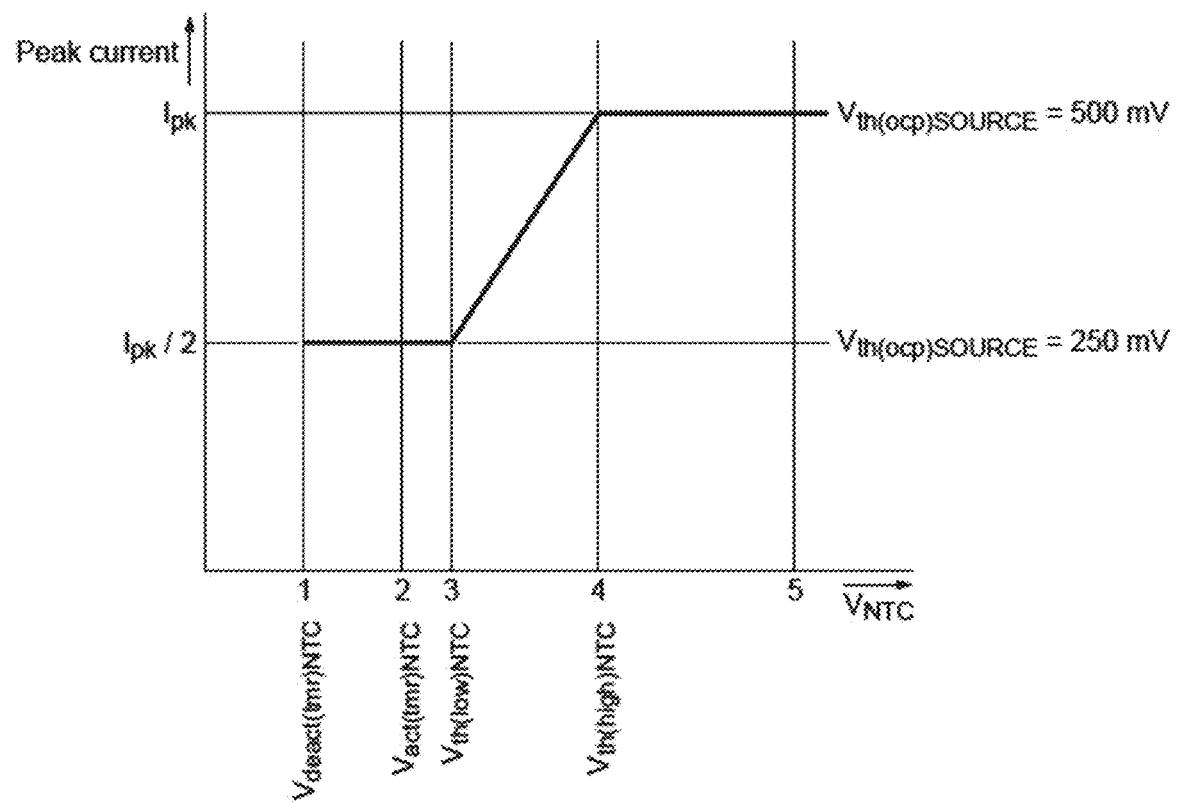
FIG. 10 is a plot of the control curve of the output of the controller integrated circuit (IC) used in the AC-DC switching power supply section in response to resistance adjustments through the potentiometer that is in electrical communication with the control integrated circuit, in accordance with one embodiment.

Referring to FIGS. 5 and 9, the potentiometer R11 is connected through resistor R3 to the temperature protection input (NTC) pin of the control integrated circuit (IC) identified by reference number U1. As noted above, adjustment to the potentiometer R11 can provide that the output current of the lamp be adjusted from 50% to 100%. The temperature protection input (NTC) pin of the control integrated circuit (IC) has an internal current source. Depending on the resistance of the potentiometer R11, and the corresponding voltage on the temperature protection input (NTC) pin, the converter reacts as shown in FIG. 10. FIG. 10 illustrates that at a high voltage for the input (NTC) pin, the converter delivers nominal output current, e.g., peak current (Ipk), i.e., 100% output current. The current at the this level, i.e., 100% output current, would reflect a resistance setting at one extreme, e.g., highest resistance, of possible adjustment of the potentiometer R11. FIG. 10 further illustrates that when the voltage on the input (NTC) pin is less than the level that provides the nominal current, the peak current is reduced. In the example depicted in FIG. 10, the total output current when the voltage on the input (NTC) pin is minimized, e.g., when the resistance setting is at an opposite extreme, e.g., lowest resistance, of possible adjustment of the potentiometer R11, is substantially half of the nominal current, i.e., 50% output current. Any percentage of the nominal output current between 50% and 100% can be achieved through adjustments of the potentiometer R11 from the lowest resistance to highest resistance values within the adjustable range. The lower output currents produced by adjustment of the potentiometer R11 provide lower values for the horticultural photosynthetic photon flux (PPF) for the light emitted by the LEDs 108b, 108r, while the higher output currents produced by the adjustment of the potentiometer R11 provide higher values for the horticultural photosynthetic photon flux (PPF) produced by the light emitted by the LEDs 108b, 108r.

In some embodiments, by virtue of the design features incorporating the potentiometer identified by reference number R11 to adjust the total output current of the lamp 100, the same lamp design can be adapted for multiple output power levels without having to make specific point designs. For example, a 20 W input power driver is suitable for any lamp rating from 10 W to 20 W.

Still referring to FIG. 5, the resistor identified by R2 can have a resistance value that can be adjusted to limit the electromagnetic emissions from the driver, i.e., the output from the integrated circuit U1 identified as "DRIVER". The value of this resistor is a result of the design optimization between the competing requirements of meeting EMI regulations, while keeping the driver efficiency at a suitable level. In one example, the resistance of the resistor identified by R2 may range from 5Ω to 500Ω. The resistor identified by R2 is present between and connected to the gate structure of the field effect transistor (FET) identified by Q1 and the driver output (DRIVER) pin of the integrated circuit (IC) identified by U1.

The diode identified by D6 is a recovery diode having a fast ON and OFF time. The high speed of the ON and OFF time helps to reduce power losses in the diode due to switching. The diode identified by D6 is forward biased and releases the energy to the output when the FET Q1 is OFF. Capacitor identified by C3 is an electrolytic capacitor that filters the switching frequency ripple on the output, and reduces the low frequency ripple on the output, and provides a smoother output current into the LEDs. The capacitor C3 reduces the flicker index and also helps to increase lamp life by keeping the peak current in the LEDs suitably below the maximum rating.

Example Circuit for Linear Topology LED String Current Control Circuit Section of the Electronic Driver In one example, the driver electronics 25 have two sections, i.e., the AC-DC switching power supply front end section 200 followed by the linear topology LED string current control section 300. The linear topology LED string current control circuit 300 includes an OP-AMP (operational amplifier) based linear current regulator. An operational amplifier (op-amp) is a DC-coupled high-gain electronic voltage amplifier with a differential input and, can be, a single-ended output. In some embodiments, an op-amp produces an output potential (relative to circuit ground) that can be hundreds of thousands of times larger than the potential difference between its input terminals.

The linear topology LED string current control section 300 of the present disclosure provides string current control without requiring that the LED string voltages be close together in order to avoid high peak currents through the light emitting diodes (LEDs). In prior string control set ups a microcontroller is employed that uses a pulse width modulation (PMW) type topology, which requires that the LED string voltages be very close together. In the prior string control designs, if the LED strings are not balanced as regards to the string voltages, i.e., the string voltages of the LED strings are not very close together, when the power supply section is driving a higher voltage LED string and the current is suddenly turned OFF by the PWM, and diverted to the lower voltage LED string, the output capacitor has to quickly discharge all the extra energy it has to drive the lower voltage LED string. It has been determined that this scenario results in the production of peak currents in the lower voltage LED string, which can exceed the LED max current rating. Exceeding the LED max current rating causes lamp reliability issues.

The above described disadvantage that results from using pulse width modulation (PMW) and micro-controllers for string current control is not present in the linear topology LED string current control circuit 300 of the driver electronics 25 employed in the present lamp design. Unlike the PWM current control using a micro-controller, the linear topology LED string current control section 300 does not have any switching involved during steady state operation. Therefore, it will not cause a peak current issue in applications having multiple LED strings, e.g., where the voltage of a second LED string 55b is detectably lower than the voltage of a first LED string 55a. The linear topology LED string current control section 300 is now described with greater detail with reference to FIG. 6.

FIG. 6 is a circuit diagram of the linear topology LED string current control section 300 of the driver electronics 25, which includes user accessible potentiometer R14 having a selectable position switch 301, e.g., lever or dial, located on the body 10 of the lamp 100; and an operational amplifier (OP-AMP) identified by reference number U2.

The linear topology LED string current control section 300 includes a reference voltage circuit portion 303. In one embodiment, the reference voltage circuit portion 303 includes a voltage generator identified by U3. In one example, the voltage generator identified by U3 is a precision 2.5V reference voltage generator. In some embodiments, the precision reference voltage is between 2V and 4V. The reference voltage circuit portion 303 may also include resistor identified by R1 that is used to limit current through the voltage generator U3.

The linear topology LED string current control section 300 includes a user accessible LED current adjustment portion 304, which includes the potentiometer identified by reference number R14. The potentiometer identified by reference number R14 in the linear topology LED string control circuit 300 of the driver electronics 25 is to control the percentage of the total current from the AC-DC switching power supply section that will flow through the LED strings 1 and 2, i.e., the first LED string 55a and the second LED string 55b. The sum of these percentages has to be 100. LED String 1 can have a current percentage varying from 0% to 100% of the total current and the same applies to LED String 2.

Figure 11:
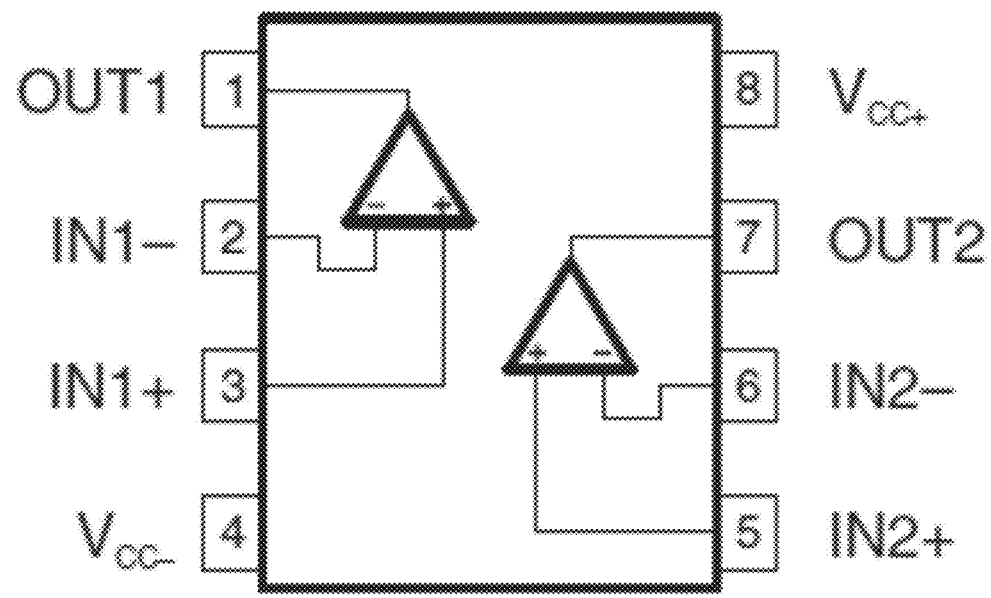
FIG. 11 is a pin out diagram of an operational amplifier as used in the linear string current control section of the driver electronics, in accordance with one embodiment of the present disclosure.
Figure 12:
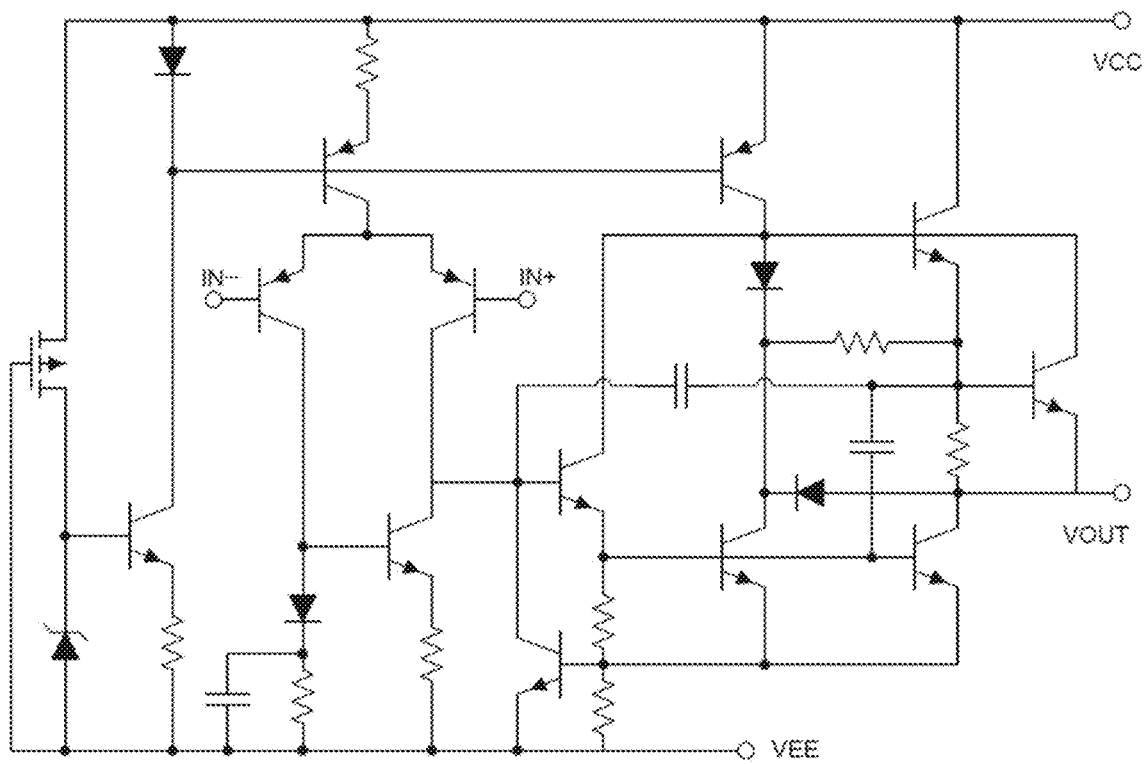
FIG. 12 is a functional block diagram of the operational amplifier as used in the linear string current control section of the driver electronics, in accordance with one embodiment of the present disclosure.

The operational amplifier identified by reference number U2 may be a dual operation amplifier that is pin-for-pin compatible with the diagram depicted in FIG. 11. The operational amplifier U2 may have a package geometry for D(SOIC), VSSOP and PDIP mounting to integrated circuits. FIG. 12 is a functional block diagram of the operational amplifier U2 (as depicted in FIG. 6) as used in the linear string current control section 300 of the driver electronics 25. IN+ of FIG. 12 corresponds to pin 5 of the operational amplifier U2, the non-inverting pin of the operational amplifier U2. In one example, the operational amplifier identified by U2 in FIG. 6, and illustrated in FIGS. 11 and 12, is a dual operational amplifier having part number LM833 and being available from Texas Instruments Inc. It is noted that the above example for the IC identified by U2 in FIGS. 6, 11 and 12 is provided for illustrative purposes, and is not intended to limit the present disclosure.

Referring to FIG. 6, the potentiometer R14 is connected to the reference voltage provided by the voltage generator identified by U3, and is also connected to the OP-AMP identified by U2. More specifically, in one example, the potentiometer R14 is connected to the non inverting input at pin 5 of the OP-AMP identified by U2. Therefore, adjustment to the potentiometer R14 to adjust its resistance changes the reference voltage applied to the OP-AMP U2 non inverting input (pin 5). In one example, the potentiometer identified by reference number R14 may be part number 3310C-101-103L provided by Bourns Inc. having an adjustable resistance ranging from 0Ω to 10K Ω.

The output of the OP-AMP U2 from pin 7 (OUT2) in response to the adjustments made to the potentiometer R14 is sent to the gate of the field effect transistor (FET) that is identified by Q2. The field effect transistor (FET) identified by Q2 is a component for a linear semiconductor switch circuit 305 portion of the linear topology LED string current control circuit 300. The field effect transistor (FET) identified by reference number Q2 may be a metal oxide semiconductor field effect transistor (MOSFET), but the semiconductor device of the linear semiconductor switch circuit portion 305 is not intended to be limited to only MOSFETs or FETs. Any semiconductor device that can operate within a linear region of a current (I) vs. voltage (V) curve, as described above with reference to FIG. 8 is suitable for using the linear semiconductor switch circuit 305 portion of the linear topology LED string current control circuit 300.

In the example FET Q2 is connected in series with the LED string 2, i.e., the blue emitting LEDs 108b provided by the second LED structure 55b depicted in FIGS. 1-3, and passes the current though this string as determined by the OP-AMP output terminal OUT2, which is pin 7.

Resistors R18 and R19 are current sense resistors which provide the feedback portion of the circuit 306. In one example, the resistors R18 and R19 are current sense resistors, which provide the feedback of the current through the LED string 2 (second LED string 55b) to the OP-AMP identified by U2. The OP-AMP output will drive the FET Q2 accordingly to match the feedback voltage on its inverting input (pin 6) to the reference voltage set by the potentiometer on the non-inverting input (pin 5).

String 1 is the red LED string (also referred to a first LED string 55a) and String 2 is the blue LED string (also referred to as second LED string 55b). The methods and structures of the present disclosure do not control the blue LED string current directly. The methods and structure of the present disclosure including the linear topology LED string current control circuit 300 control the red LED string current. This influences the current in blue LED string. The blue LED string current is equal to the AC DC Power Supply total current minus the red LED String current. As the AC DC Power Supply current is constant, when the red LED string current is reduced, blue LED string current increases and vice-versa.

Values of resistors R20 and R17 value are adjusted to nullify any undesirable offset from the OP-AMP identified by U2.

The resistors identified by R8 and R16 are optional resistors that may be implemented for the purposes of having a non-linear response of potentiometer rotation to output current. This provides finer control at certain current levels. In one embodiment, to provide a linear change in the output current against potentiometer rotation, the resistors identified by R8 and R16 can be 0 ohm resistors.

The above embodiments and examples are given above to illustrate the scope and spirit of the present invention. These embodiments and examples will make apparent, to those of ordinary skill in the art, other embodiments and examples. These other embodiments and examples are within the contemplation of the present invention. Therefore, the present invention should be limited only by the appended claims.

What is claimed is:

1. A lamp assembly of horticultural growth comprising:
a light engine that includes at least a first and second string of light emitters;
an AC-DC switching power supply section of a driver electronics circuit including a first potentiometer for adjusting total current to the light engine, wherein adjusting the total current adjusts the photosynthetic photon flux (PPF) of light emitted by the light engine; and
a linear topology LED string current control section of the driver electronics circuit including an operational amplifier controlled by a second potentiometer to operate a field effect transistor (FET) of the driver electronics in the linear portion of the FETs operation range to adjust a percentage of the total current that passes from the linear string current control section to the first and second string of the light emitters, wherein adjusting the percentage of the total current to the first and second string of the light emitters adjusts a spectral power distribution of light being emitted by the light engine.

2. The lamp assembly of claim 1, wherein the light emitters are solid state light emitters selected from the group consisting of semiconductor light-emitting diodes (LEDs), organic light-emitting diodes (OLED), polymer light-emitting diodes (PLED) and combinations thereof.

3. The lamp assembly of claim 2, wherein the first string of light emitters comprises light emitting diodes that emit red wavelengths of light, and the second string of light emitters comprises light emitting diodes that emit blue wavelengths of light.

4. The lamp assembly of claim 2, wherein the first string of light emitters emits light having a wavelength ranging from 600 nm to 700 nm, and the second string of light emitters emits light having a wavelength ranging from 400 nm to 500 nm.

5. The lamp assembly of claim 1, wherein the lamp includes a body for containing at least the driver electronics, wherein a first selectable position switch to the first potentiometer is present outside the body and is connected to the first potentiometer that is positioned within the body.

6. The lamp assembly of claim 1, wherein the lamp includes a body for containing at least the driver electronics, wherein a second selectable position switch to the second potentiometer is present outside the body and is connected to the second potentiometer that is positioned within the body.

7. The lamp assembly of claim 1, wherein the current flowing through the first string of light emitters have a percentage ranging from 0% to 100% of the total current.

8. The lamp assembly of claim 7, wherein the current flowing through the second string of light emitters have a percentage ranging from 0% to 100% of the total current.

9. The lamp assembly of claim 8, wherein the percentage of current flowing through the second string of light emitters when added to the percentage of current flowing through the first string of light emitters during light being emitted by the light engine is equal to 100%.

10. The lamp assembly of claim 1, wherein the driver electronics are free of microcontrollers for controlling the total current and the percentage of the total current to the first and second string.

11. The lamp assembly of claim 1, wherein the photosynthetic photon flux (PPF) of light emitted by the first string of light emitters having wavelengths that provides red light ranges from 15 μmol/s to 30 μmol/s.

12. The lamp assembly of claim 1, wherein the photosynthetic photon flux (PPF) of light emitted by the second string of light emitters having wavelengths that provides blue light ranges from 3.5 μmol/s to 7 μmol/s.

13. The lamp assembly of claim 1, wherein a precision reference voltage is between 2V and 4V.

14. An illumination method for horticultural growth comprising:
providing a light engine including at least a first and second string of light emitting diodes and driver electronics including an AC-DC switching power supply section of a circuit including a first potentiometer for adjusting total current to the light engine, and a linear string current control section of the circuit including an operational amplifier controlled by a second potentiometer to operate a field effect transistor (FET) in the linear portion of the FETs operation range to adjust a percentage of the total current to the first and second string of the light emitters;
adjusting the first potentiometer for adjusting the total current to the light engine to adjust the photosynthetic photon flux (PPF) of light emitted by the light engine of the lamp; and
adjusting the second potentiometer to adjust the percentage of the total current to the first and second string of the light emitters to adjust the spectral power distribution (SPD) of the light emitted by the light engine of the lamp.

15. The method of claim 14, wherein the first string of light emitting diodes emit red light having a wavelength ranging from 600 nm to 700 nm, and the second string of light emitting diodes emit blue light having a wavelength ranging from 400 nm to 500 nm.

16. The method of claim 14, wherein the current flowing through the first string of light emitting diodes have a percentage ranging from 0% to 100% of the total current.

17. The method of claim 16, wherein the current flowing through the second string of light emitting diodes have a percentage ranging from 0% to 100% of the total current.

18. The method of claim 17, wherein the percentage of current flowing through the second string of light emitting diodes when added to the percentage of current flowing through the first string of light emitting diodes during light being emitted by the light engine is equal to 100%.

19. The method of claim 14, wherein the photosynthetic photon flux (PPF) of light emitted by the first string of light emitting diodes having wavelengths that provides red light ranges from 15 μmol/s to 30 μmol/s.

20. The method of claim 14, wherein the photosynthetic photon flux (PPF) of light emitted by the second string of light emitting diodes having wavelengths that provides blue light ranges from 3.5 μmol/s to 7 μmol/s.

* * * * *